United States Patent
Lorenz et al.

(10) Patent No.: US 11,699,343 B2
(45) Date of Patent: Jul. 11, 2023

(54) METHODS AND SYSTEMS FOR IDENTIFYING NAVIGABLE ELEMENTS AFFECTED BY WEATHER CONDITIONS

(71) Applicant: TomTom Traffic B.V., Amsterdam (NL)

(72) Inventors: Christian Lorenz, Berlin (DE); Stefan Lorkowski, Berlin (DE); Nikolaus Witte, Berlin (DE); Robin Tenhagen, Amsterdam (NL)

(73) Assignee: TomTom Traffic B.V., Amsterdam (NL)

( * ) Notice: Subject to any disclaimer, the term of this patent is extended or adjusted under 35 U.S.C. 154(b) by 153 days.

(21) Appl. No.: 17/151,354

(22) Filed: Jan. 18, 2021

(65) Prior Publication Data
US 2021/0183242 A1    Jun. 17, 2021

Related U.S. Application Data

(63) Continuation of application No. 16/070,496, filed as application No. PCT/EP2017/052888 on Feb. 9, 2017, now Pat. No. 10,896,602.
(Continued)

(30) Foreign Application Priority Data

Mar. 10, 2016    (GB) ..................... 1604159

(51) Int. Cl.
    *G08G 1/052*    (2006.01)
    *G01C 21/36*    (2006.01)

(52) U.S. Cl.
    CPC ......... *G08G 1/052* (2013.01); *G01C 21/3691* (2013.01)

(58) Field of Classification Search
CPC .... G08G 1/052; G08G 1/0104; G08G 1/0967; G01C 21/3691
See application file for complete search history.

(56) References Cited

U.S. PATENT DOCUMENTS 9,965,952 B2 * 5/2018 Abraham ............. G08G 1/0116
2010/0299055 A1  11/2010 Hillbrandie et al.
(Continued)

FOREIGN PATENT DOCUMENTS

WO  2013190233  12/2013
WO  2014001549   1/2014
(Continued)

OTHER PUBLICATIONS

Search Report dated Aug. 18, 2016 for United Kingdom patent application No. GB 1604159.2.
(Continued)

*Primary Examiner* — Rachid Bendidi
*Assistant Examiner* — Abdalla A Khaled
(74) *Attorney, Agent, or Firm* — Park. Vaughan, Fleming & Dowler LLP

(57) ABSTRACT

A method of determining whether one or more navigable elements of a navigable network within a geographic area are still affected by a precipitation weather event. A quantity parameter is associated with each segment of an electronic map representing the navigable network and indicates the amount of precipitation remaining on the navigable element or portion thereof represented by the segment. The value of the quantity parameter increases in the presence of any precipitation weather event, and decreases ac cording to a predefined function with respect to time in the absence of any such precipitation weather event. A speed of travel of one or more devices along the navigable element or portion thereof represented by a segment is determined and compared to an expected speed of travel for the segment; the value of the quantity parameter being decreased based on the comparison. The value of quantity parameter can be used to generate weather events and/or attribute the cause of a congestion event as being the precipitation weather event.

20 Claims, 14 Drawing Sheets

Related U.S. Application Data

(60) Provisional application No. 62/293,301, filed on Feb. 9, 2016.

(56) References Cited

U.S. PATENT DOCUMENTS

| | | | |
|---|---|---|---|
| 2013/0018577 A1 | 1/2013 | Gooding | |
| 2013/0258878 A1 | 10/2013 | Wakikawa et al. | |
| 2013/0304379 A1 | 11/2013 | Fulger et al. | |
| 2013/0311076 A1 | 11/2013 | Mieth et al. | |
| 2014/0067265 A1* | 3/2014 | Maston | G01C 21/3697 340/905 |
| 2014/0278829 A1 | 9/2014 | MacAdam et al. | |
| 2014/0303806 A1* | 10/2014 | Bai | G01C 21/3697 701/1 |
| 2015/0088814 A1 | 3/2015 | van der Laan et al. | |
| 2015/0120174 A1* | 4/2015 | Lewis | G08G 1/0129 701/118 |
| 2015/0168157 A1* | 6/2015 | Hoch | B60W 40/107 701/400 |
| 2016/0275404 A1* | 9/2016 | Abraham | G06Q 10/20 |
| 2017/0076594 A1* | 3/2017 | Scofield | A61B 5/369 |
| 2017/0098373 A1* | 4/2017 | Filley | H04W 4/90 |
| 2017/0115126 A1* | 4/2017 | McMaster | H04W 68/005 |
| 2017/0365169 A1* | 12/2017 | Tennent | G08G 1/08 |

FOREIGN PATENT DOCUMENTS

| | | |
|---|---|---|
| WO | 2014150197 | 9/2014 |
| WO | 2016034736 | 3/2016 |

OTHER PUBLICATIONS

International Search Report dated Jul. 10, 2017 for International patent application No. PCT/EP2017/052888.

International Search Report dated May 15, 2017 for International patent application No. PCT/EP2017/052888.

\* cited by examiner

Ice

Fog

Wind

Rain

METHODS AND SYSTEMS FOR IDENTIFYING NAVIGABLE ELEMENTS AFFECTED BY WEATHER CONDITIONS

FIELD OF THE INVENTION

The present invention relates to methods and systems for identifying navigable elements of a network of navigable elements along which traffic flow may be considered to be affected by weather conditions. The invention may further relate to methods and systems for determining whether one or more navigable elements of a navigable network are still affected by an earlier precipitation weather event, The invention may extend to generating data indicative of a weather event in relation to such identified elements, and may also extend to generating data indicative of a congestion event caused by adverse weather in relation to such identified elements.

BACKGROUND TO THE INVENTION

Road users increasingly rely upon traffic flow information to inform them of any incidents which may affect travel time on a journey, and to help plan travel. Such information may be provided to a user during navigation along a route via an in-car navigation device, such as a PND or integrated device, or may be provided as an input to an Advanced Driver Assistance System (ADAS). Traffic information may also be used for route planning, e.g. by a navigation device or ADAS, before commencing a journey, or to recalculate a fastest route during a journey if conditions change en route. The information has conventionally been based on messages sent over an FM radio network via the Traffic Message Channel (TMC), which may be received by navigation devices and conveyed to a user, or otherwise used by an ADAS or navigation system. A typical TMC message would include information identifying a geographic location, type and direction of an incident according to certain standard codes.

More recently other traffic information systems have been developed, such as the "HD Traffic™" system developed by TomTom International B.V., which relies at least in part upon other sources of traffic information. For example, the HD Traffic system is based upon so-called "probe" data, obtained from mobile phones, PNDs and other devices having positioning capability located in vehicles, which can be used to identify locations and speeds of vehicles, and thus indicate traffic conditions.

The above systems have improved the accuracy with which traffic information can be provided to users of navigation devices. However, such systems typically attribute any significant reduction in traffic flow along a navigable element relative to a free flow speed of travel along the element to the presence of a traffic jam. The Applicant has realised that a reduction in traffic flow along a navigable element may not always, at least solely, be the result of a traffic jam on the element. In particular, weather conditions may also affect traffic flow along a navigable element, whether or not a traffic jam is also present. The Applicant has realised that it would be advantageous to be able to identify those navigable elements of a navigable network of elements along which traffic flow may be considered to be affected by weather conditions.

SUMMARY OF THE INVENTION

In accordance with a first aspect of the invention there is provided a method of identifying navigable elements along which traffic flow is affected by adverse weather conditions in a navigable network within a geographic area, the method comprising:

obtaining weather data indicative of weather conditions in the geographic area;

obtaining positional data relating to the movement of a plurality of devices along the navigable element with respect to time;

using the positional data to determine a current speed of travel along the navigable element;

comparing the determined current speed of travel to a free flow speed for the navigable element;

determining whether the navigable element is affected by one or more adverse weather conditions, when said comparison indicates the current speed of travel along the element is reduced relative to the free flow speed for the navigable element, and wherein said reduction is less than a threshold associated with identifying a congestion event as affecting the navigable element; and generating data indicative of a weather event affecting traffic flow along the element, when the navigable element is determined to be affected by one or more adverse weather conditions.

The present invention extends to a system for carrying out a method in accordance with any of the embodiments of the invention described herein.

In accordance with a second aspect of the invention there is provided a system for identifying navigable elements along which traffic flow is affected by adverse weather conditions in a navigable network within a geographic area, the system comprising:

means for obtaining weather data indicative of weather conditions in the geographic area;

means for obtaining positional data relating to the movement of a plurality of devices along the navigable element with respect to time;

means for using the positional data to determine a current speed of travel along the navigable element;

means for comparing the determined current speed of travel to a free flow speed for the navigable element;

means for determining whether the navigable element is affected by one or more adverse weather conditions, when said comparison indicates the current speed of travel along the element is reduced relative to the free flow speed for the navigable element, and wherein said reduction is less than a threshold associated with identifying a congestion event as affecting the navigable element; and means for generating data indicative of a weather event affecting traffic flow along the element, when the navigable element is determined to be affected by one or more adverse weather conditions.

It will be appreciated that any feature described by reference to the first aspect of the invention may equally be applied to embodiments in accordance with the second aspect of the invention and vice versa. Thus, if not explicitly stated herein, the system of the present invention may comprise means for carrying out any of the steps of the method described. The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a congestion and/or weather event, and/or the positional data used to determine the existence of a congestion and/or weather event.

The present invention in any of its aspects involves comparing a current (or near current) average speed of travel along a navigable element of a navigable network to a free flow speed for the element. If the current average speed is indicative of a reduction in the speed of travel along the element relative to the free flow speed, but is less than a threshold associated with identifying a congestion event, such as a traffic jam, as affecting the navigable element, then it is determined whether the element is affected by one or more adverse weather conditions. If it is found that the element is affected by one or more adverse weather conditions, data indicative of a weather event affecting traffic flow along the element is generated. Thus, by consideration of a reduction in speed along an element, an inference as to the presence of a weather event may be made. In particular, if traffic flow is reduced, but by an amount which is less than an amount that is considered to be indicative of a traffic jam, and additionally, weather data indicative of one or more adverse weather conditions on the navigable element exists, then it is determined that there is a weather event affecting flow along the element. Conventionally, in traffic monitoring systems, such reductions in speed are ignored, since it is typically not possible to assign a suitable cause to the event, and thus it is not known whether it would be helpful to inform drivers of the event. Data indicative of the generated weather event may be provided, for example, to users of navigation devices, such as navigation devices associated with vehicles. Such devices may be mobile devices, such as portable navigation devices (PNDs), advanced driver assistance systems (ADAS) or integrated in-vehicle systems. By providing the ability to identify weather events affecting traffic flow along elements of a navigable element, the present invention may allow information to be provided to drivers that may warn them of the weather conditions and/or which may be taken into account when determining a route across the navigable network.

The methods of the present invention are, in preferred embodiments, implemented by a server. Thus, in embodiments, the system of the present invention comprises a server comprising the means for carrying out the various steps described, and the method steps described herein are carried out by a server.

Any of the steps of the invention described herein may be carried out in relation to one or more navigable elements of the navigable network.

The present invention considers live positional data relating to the movement of a plurality of devices with respect to time along one or more navigable element of a navigable network to determine whether traffic flow along the element may be affected by a traffic jam and/or adverse weather conditions. It will be appreciated that the navigable network as referred to herein is a real world or physical navigable network, e.g. a road network. The invention is applicable, however, to any navigable network, e.g. networks of paths, rivers, canals, cycle paths, tow paths, railway lines, or the like.

The network may be represented electronically by digital map data. The digital map data may be stored by or otherwise accessible by the server, in embodiments in which the method is implemented using a server. In the digital map data, the navigable network is represented by a plurality of navigable segments connected by nodes, wherein a navigable element of the network may be represented by one or more navigable segments. Embodiments of the present invention are described with reference to road segments and elements, and preferably the navigable elements represent highways with free flow speeds of more than 100 km/h (kilometres per hour). It should be realised that the invention may also be applicable to other types of navigable elements. For ease of reference these are commonly referred to as road elements.

The positional data used in accordance with the invention is positional data relating to the movement of a plurality of devices along the or each navigable element with respect to time. The method may comprise obtaining positional data relating to the movement of a plurality of devices with respect to time in the navigable network, and filtering the positional data to obtain positional data relating to the movement of a plurality of devices with respect to time along the or each given navigable element along which traffic flow is to be considered in relation to potential congestion and/or weather conditions. The step of obtaining the positional data relating to the movement of devices along the or each navigable element may be carried out by reference to the digital map data indicative of the navigable network. The method may involve the step of matching positional data relating to the movement of devices in a geographic region including the navigable network to at least the or each navigable element that is being considered in accordance with the invention.

In embodiments, the method comprises obtaining positional data relating to the movement of a plurality of devices along one or more navigable segments of the digital map representative of the navigable network with respect to time in a given time period.

In some arrangements the step of obtaining the positional data may comprise accessing the data, i.e. the data being previously received and stored. The positional data is used to determine current, or at least near current, speeds of travel along the navigable elements, and thus is "live" positional data. It will be appreciated, however, that the data may be stored shortly before being used. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple, devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention.

The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The present invention provides "live", i.e. short term, detection of traffic jams and/or adverse weather events, based on current or near current data.

The method of the present invention involves obtaining and using "live" positional data relating to the movement of a plurality of devices with respect to time along the or each navigable element that is assessed in accordance with the invention. Live data may be thought of as data which is relatively current and provides an indication of relatively current conditions on each navigable element. The live data may typically relate to the conditions on the elements within the last 30 minutes, 15 minutes, 10 minutes or 5 minutes. By using live positional data in determining the traffic jam and/or weather event information, it may be assumed that the information determined is currently applicable, and may be applicable in the future, at least in the shorter term. The use of live positional data allows accurate and up to date information to be determined, that can be relied upon by road users and/or navigation devices or ADAS.

The positional data is used to determine an average speed of travel along the navigable element in a given time period, e.g. a time period in the recent past, such as the last two minutes; the average speed thus being indicative of a current average speed. In embodiments, in which the obtained positional data relates to the movement of a plurality of devices along one or more navigable segments of a digital map, the positional data is used to determine an average speed of travel along at the one or more navigable segments in the given time period.

The present invention involves the step of comparing the determined current average speed of travel along a navigable element to a free flow speed for the navigable element. The free flow speed of a navigable element is indicative of the average speed of vehicles traversing the element during a period of time in which there is no or substantially little traffic. This period may for example be one or more nighttime hours where the attainable speed may be less influenced by other users. Such free-flow speeds will still reflect the influence of speed limits, road layout and traffic management infrastructure for example. In embodiments data indicative of the free flow speed is associated, in the digital map data, with data indicative of the navigable segment representing the navigable element to which it relates. Under these conditions, it may be assumed with greater certainty that an appreciable reduction in the average speed of travel is indicative of the presence of an event affecting traffic flow along the element, i.e. a congestion event, such as a traffic jam, and/or adverse weather event.

The method may extend to the step of obtaining the free flow speed for the or each navigable element or segment. The step of obtaining the free flow speed for an element or segment may comprise analysing positional data relating to the movement of devices that traversed the navigable element or segment within a given predetermined time period. The relevant data may be obtained by suitable filtering of the positional data by reference to time. In order to be able to obtain a free flow speed, the predetermined time period should be chosen appropriately so that it will include data relating to movements which are representative of movements made under free-flow conditions. Typically the time period will be relatively long, such as a 24 hour period, or longer. For example, a week long period, or even a month or longer period might be considered, if free flow conditions do not occur every day, or week, etc. The step of obtaining the free-flow speed for an element or segment may comprise analysing positional data relating to the movement of devices that traversed the element or segment within a given predetermined time period, preferably wherein the free flow time obtained by averaging the speed of different devices traversing the element or segment in the given time period. In embodiments in which the navigable elements are represented by segments of a digital map, data indicative of a free flow speed may be associated with each segment.

The method of the present invention comprises the step of comparing the current speed of travel based on the positional data to the free flow speed for an element. Any reduction in speed that is determined may be a reduction in speed along at least a portion of the affected element. It will be appreciated that a navigable stretch along which traffic flow is reduced, whether due to congestion, a weather event, or for any other reason, may comprise at least a portion of one or more navigable element.

In embodiments, when the current speed of travel along the element is reduced relative to the free flow speed for the navigable element by more than a first threshold, the method comprises identifying, and optionally generating data indicative of, a congestion event affecting the element. The congestion event may be reflective of one or more of: stationary traffic (e.g. having a speed less than 20% of free flow); queuing traffic (e.g. having a speed between 20% and 40% of free flow); and slow moving traffic (e.g. having a speed between 40% and the first threshold). The first threshold may be a fixed percentage value of the free flow speed, such as 60% (i.e. a reduction of 40%), or it may be a dynamic value that varies depending on the applicable navigable element. For example, historical traffic patterns may allow a congestion to be identified at different percentage values on different navigable elements; such techniques can be found, for example, in WO 2012/104392 A1 and WO 2012/104393 A1, the entire content of which is incorporated herein by reference. In any event, the first threshold is set as a reduction in speed relative to the free flow speed that is attributable to a congestion event on the element. The method may comprise, when a reduction in the current speed of travel along the element relative to the free flow speed for the navigable element does not exceed the first threshold, not generating data indicative of congestion, e.g. a traffic jam, affecting traffic flow along the element. In embodiments, and as will be discussed in more detail below, an identified congestion event can also be attributed to adverse weather conditions, i.e. that the cause of the traffic jam on a navigable element is due to bad weather, such as heavy precipitation (rain, snow, etc), fog, high winds, etc.

In the method of the present invention, when the comparison indicates that the current speed of travel along a navigable element is reduced relative to the free flow speed, but less than the first threshold indicative of a congestion event discussed above, a determination as to the existence of a weather event may be made. In embodiments, the such a determination is made only when the current speed of travel is reduced relative to the free flow speed by more than a second threshold. The second threshold may be set, by way of example, at a reduction of 20% relative to the free flow speed (i.e. 80% of the free flow speed). The second threshold is a predetermined threshold that has been set as being indicative of a level of reduction in speed along the element that is potentially attributable to adverse weather conditions affecting traffic flow on the element. Such a threshold may be set as desired, and may be a fixed value or a variable value that depends, for example, on the applicable navigable element.

The second threshold is set such that a reduction in speed that is less than that defined by the first threshold, but greater than that set by the second threshold, may be taken as not indicative of a congestion event, e.g. traffic jam, for the purposes of the invention. This reduction in flow is potentially attributable to adverse weather conditions. Conventional techniques would typically not adequately deal with such lesser degrees of reduction in traffic flow. By attributing reduction in traffic flow only to congestion, e.g. traffic jams, such techniques would have to either determine the presence of a traffic jam even for these lesser degrees of reduction in flow, when in reality a jam might not exist, or otherwise disregard the reduction in flow. However, the Applicant has realised that in some cases, such reduction in flow may be attributable to adverse weather conditions. Where this is the case, it would be desirable to be able to disseminate such information. This may enable a driver to take appropriate precautions, e.g. reduce speed ahead of the affected region, or, may enable a routing engine to route around the affected region.

The method may comprise the step of determining whether the navigable element is affected by one or more (adverse) weather conditions when there is a reduction in current speed relative to the free flow speed less than that indicative of congestion, e.g. when the current speed along the element is reduced relative to the free flow speed anywhere within a range defined between the first threshold and the second threshold. Thus, the first and second thresholds may define the upper and lower limits for the reduction respectively.

Nonetheless, it is envisaged that the method may involve the use of at least one third thresholds between the first and second thresholds, wherein the step of determining whether a navigable element is affected by one or more adverse weather conditions is carried out where the reduction in speed of travel lies anywhere within the range defined between the at least one third and second thresholds. In other words, the upper limit to the range of reduction for which weather conditions are considered may or may not correspond to the first threshold.

When it is determined that the navigable element is affected by (at least one) adverse weather condition, the method comprises generating data indicative of a weather event affecting traffic flow along the element. Preferably, the data indicative of the weather event comprises at least one of: data indicative of the location of the weather event on the navigable network (e.g. with respect to a stretch of the digital map; the stretch comprises at least a portion of one or more segments); data indicative of the type of weather condition and/or severity of the weather condition (i.e. the type of weather event); the speed of travel (i.e. the determined reduced speed relative to the free flow speed) associated with the weather event; and data indicative of a time of applicability for the weather event, e.g. a start time, duration and/or end time. Thus, where it is determined that there is a reduction in speed along an element of an amount between the first and second thresholds, and it is found that one or more adverse weather conditions are affecting that element, then the a weather event is generated. This weather event may be used by devices e.g. to provide a warning to a user.

The method may further comprise, for a navigable element for which it has been determined that a reduction in the speed of travel along the element exceeds the second threshold but not the first threshold, and in respect of which a weather event has been generated, determining subsequently that the reduction in the average speed of travel along the element as indicated by the current speed for the element has exceeded the first threshold, and additionally generating data indicative of a congestion event affecting the element. Thus, the reduction in speed of travel along an element may be determined at one or more subsequent times, e.g. periodically, and compared once more to the second threshold.

The method may comprise, when a reduction in the current speed of travel along the element relative to the free flow speed for the navigable element is determined, wherein said reduction is less than a threshold, e.g. the first threshold, associated with identifying a congestion event, but wherein the navigable element is determined not to be affected by one or more adverse weather conditions, not generating data indicative of a weather event affecting traffic flow along the element.

In some embodiments, and wherein a congestion event has been identified as affecting a navigable element, e.g. when the current speed of travel along the navigable element is reduced relative to the free flow speed by more than the first threshold, a determination can be made as to whether the cause of the congestion event can be attributed to an adverse weather condition, e.g. instead of the volume of the vehicles travelling along navigable element, road works or other construction on the navigable element, etc. Indeed, it is considered that the marking of congestion events as being related to particular adverse weather conditions may be new and inventive in its own right.

Thus, in accordance with a third aspect of the invention there is provided a method of identifying navigable elements along which traffic flow is affected by adverse weather conditions in a navigable network within a geographic area, the method comprising:

obtaining weather data indicative of weather conditions in the geographic area;

obtaining positional data relating to the movement of a plurality of devices along the navigable element with respect to time, and using the positional data to identify a congestion event as affecting traffic flow along the navigable element;

determining whether the cause of the congestion event is attributable to one or more adverse weather conditions using one or more attributes of the congestion event, when the navigable element is determined to be affected by one or more adverse weather conditions; and associating data indicative of the one or more adverse weather conditions with the identified congestion event, when the cause of the congestion event is determined to be attributable to the one or more adverse weather conditions.

In accordance with a fourth aspect of the invention there is provided a system for identifying navigable elements along which traffic flow is affected by adverse weather conditions in a navigable network within a geographic area, the system comprising:

means for obtaining weather data indicative of weather conditions in the geographic area;

means for obtaining positional data relating to the movement of a plurality of devices along the navigable element with respect to time, and using the positional data to identify a congestion event as affecting traffic flow along the navigable element;

means for determining whether the cause of the congestion event is attributable to one or more adverse weather conditions using one or more attributes of the congestion event, when the navigable element is determined to be affected by one or more adverse weather conditions; and means for associating data indicative of the one or more adverse weather conditions with the identified congestion event, when the cause of the congestion event is determined to be attributable to the one or more adverse weather conditions.

It will be appreciated that any feature described by reference to the third aspect of the invention may equally be applied to embodiments in accordance with the fourth aspect of the invention and vice versa. The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a congestion and/or weather event, and/or the positional data used to determine the existence of a congestion and/or weather event.

Furthermore, the present invention in these further aspects may include any or all of the features described in relation to the first and second aspects of the invention, and vice versa, to the extent that they are not mutually inconsistent.

The attribution of a congestion event to one or more adverse weather conditions is based on one or more attributes of the congestion event, and, in embodiments, is based on a speed of travel within the congestion event (such as the current speed determined using the positional data as described above) and/or a start time of the congestion event (e.g. the time at which the determined current speed was reduced relative to the free flow speed by more than the first threshold).

The attribution may be based on a distribution of speeds within the congestion event. For example, the method may comprise determining a distribution of speeds along the portion of the element deemed to be affected by the congestion event, and identifying the cause of the congestion event to adverse weather only when the distribution of speed is below a given threshold. This may be determined by consideration of a standard deviation or other measure of variance of speeds. It has been found that adverse weather tends to result in a smaller variation of speeds within the area of restricted flow than would be expected in the case of a conventional traffic jam (or other congestion event) caused by nonweather events.

Alternatively, or additionally, the attribution may be based upon a comparison of a speed of travel within the congestion event (e.g. a current average speed) with and an applicable expected speed of travel along the element. For example, the method may comprise determining an applicable expected speed of travel along the element, and attributing the cause of the congestion event as being weather related when the determined speed of travel within the congestion event is irregular relative to the applicable expected speed of travel, e.g. is bigger or smaller than the applicable expected speed of travel by more than a predetermined amount. In embodiments in which the navigable elements are represented by segments of a digital map, data indicative of at least one expected speed of travel may be associated with each segment. The or each expected speed of travel may be any suitable expected speed of travel indicative of the expected average speed of travel along the element. The expected speed of travel may be time dependent. Thus the or each expected speed of travel may be in respect of an applicable given time period.

The expected speed of travel along a navigable element may, in some embodiments, be a historical speed of travel along the navigable element. In this context the words "historic" or "historical" should be considered to indicate data that is not live. Historic average speeds and historic travel times may for example relate to events occurring days, weeks or even years in the past. A historic average speed may be recorded directly, or may be calculated from a recorded historic travel time across the segment. Historical positional data can also be referred to as aggregated positional data, since it will typically comprise positional data from a plurality of different mobile devices collected over an extended period of time, such as a number of weeks or months. Historical positional data is therefore useful in analysing the repeating patterns in the behaviour of vehicles on portions of the network over long time periods (such as the average speed of travel along a road at various different times of the day). The historical speed of travel along a navigable element may be an average historical speed of travel. An element may have a plurality of historic average speeds of travel associated therewith, e.g. with each average speed being representative of the average speed along the segment during a particular time period. The time periods may be in respect of different times of day and days of the week.

The method may extend to the step of obtaining historical speed data, e.g. average speed data, for a navigable element. The method may or may not extend to the step of determining the historic speed data associated with a navigable element. The step of obtaining the historic speed data may simply involve accessing the applicable data. In some embodiments historic speed data, and preferably historic average speed data, is stored in association with each navigable segment of a digital map that is representative of the navigable elements of the navigable network. In a preferred embodiment, the historic speed data for traversing a navigable element is obtained using positional data relating to the movement of a plurality of devices with respect to time along the navigable element. In other words, vehicle probe data is used. The positional or probe data may be of any of the types described above in relation to the live positional data that is used, but instead being historical data. An average speed associated with an element can be determined according to the method described in WO 2009/053411 A1; the entire contents of which is incorporated by reference. In this method a plurality of time-stamped position data is preferably captured/uploaded from a plurality of navigation devices, such as portable navigations devices (PNDs). This data is preferably divided into a plurality of traces, with each trace representing data received from a navigation device over a predetermined time period. An average may then be taken of the recorded speeds within each predetermined time period for each navigable element.

The expected speed of travel along a navigable element may, in some embodiments, be a historical jam speed of travel for the navigable element. The historical jam speed is derived from historical speed data, and is an indication of the typical speed of travel across an element (or segment in the context of a digital map) when there is a congestion event (or traffic jam). Methods for deriving historical jam speeds are described in WO 2012/104392 A1; the entire contents of which is incorporated herein by reference. For example, the jam speed may be an indication of the most likely average speed of travel across the element (or segment) when there is a congestion event, or an average of all average speeds below a jam threshold speed (which is a speed at which congestion can be said to exist, e.g. the first threshold described above).

Alternatively, or additionally, the attribution may comprise determining a start time for the or each determined adverse weather condition, e.g. using weather data, and comparing the start time to a start time of the congestion event. Where the start time of the congestion event precedes the start time of the or each weather condition, then it may be determined that the weather condition is not responsible for the speed reduction.

Alternatively, or additionally, the attribution may comprise determining whether there are other navigable elements in proximity to the given element also affected by congestion events, and which are all affected by the same one or more adverse weather conditions. If there are other elements exhibiting a similar reduction in flow speed (i.e. speed of travel along the element), then it may be assumed that the congestion event may be attributed to the weather condition(s).

In any of the embodiments of the invention in which it is determined whether a navigable element is affected by an adverse weather condition, the adverse weather condition may be any of: presence or amount of precipitation, for example rain, hail, sleet or snow; wind speed or direction; presence or amount of lying snow; presence or amount of ice; level of visibility; presence or amount of fog; and/or temperature. Adverse weather conditions may comprise any of the above types of weather, but only when the weather condition is above a predetermined level of severity. Thus, for example, light rain may not count as an adverse weather condition, whereas heavy rain would count as an adverse weather condition. The method preferably also comprises determining a type or types of any adverse weather condition affecting an element, and/or determining a severity of any weather condition affect an element to identify whether it qualifies as an adverse weather condition.

The determination may be based on weather data indicative of weather conditions in the geographic area (within which the navigable network lies). The weather data may be of any suitable type. The weather data is indicative of weather conditions applicable to the current time. The weather data may be indicative of the expected weather conditions applicable to the current time, i.e. forecast conditions, and/or may be indicative of actual weather conditions. Preferably the determination is based on live weather data, i.e. being based upon live weather reports indicative of the actual weather. The weather data is indicative of one or more weather conditions that may have a negative impact on traffic flow, i.e. adverse weather events. Of course the weather data may also comprise data indicative in general of conditions affecting regions, whether adverse or not.

In some embodiments the method may comprise using the weather data to determine whether a navigable element is affected by one or more adverse weather conditions, and preferably a type or types of weather condition affecting the element, once a suitable reduction in speed relative to the free flow speed has been found. The method may then involve looking up whether the element is affected by an adverse weather condition or conditions (and preferably a type or types of any condition), e.g. using the element location to interrogate the weather data. In other embodiments the method may comprise determining whether the navigable element is associated with an indication of an adverse weather condition affecting the element. Such an indication may be associated with digital map data indicative of a segment representing the element. Thus, elements that are affected by an adverse weather condition may already be associated with an indication, such as a flag, as to the presence of an adverse weather condition. An element may also be associated with data indicative of a type or types of any weather condition affecting the element. The method may comprise using weather data indicative of weather conditions in the geographic area (within which the navigable network lies) to identify a subset of navigable elements of the navigable network that are affected by an adverse weather condition, and associating the or each navigable element with an indication as to the existence of an adverse weather condition affecting the element, and preferably a type of the or each weather condition. When it is desired to determine whether a navigable element is affected by one or more weather conditions, this may be carried out by determining whether the element is associated with such an indication. Again, a navigable element may be associated with data indicative of a type or types of adverse weather condition affecting the element. However or whenever it is used to determine whether a navigable element is affected by an adverse weather condition, the weather data upon which the determination is based may be obtained from any suitable source or sources of weather data. For example, the data may be obtained from a weather server. The server may be a different server to a server that, in preferred embodiments, performs the method of the present invention. The weather data may be from a repository storing data indicative of one or more regions of the navigable network currently considered to be affected by one or more adverse weather conditions, optionally wherein the data comprises data indicative of the type or types of adverse weather condition affecting the or each region. The repository may be stored by a remote server.

The weather data may be indicative of one or more regions, each being affected by one or more adverse weather condition. The weather data may or may not be in relation to the navigable elements of the navigable network, or navigable segments of a digital map indicative thereof. For example, the weather data may provide weather data by reference to the or each navigable element in the navigable network affected by the weather condition. In other embodiments the method comprises using the data to determine whether the navigable element is affected by an adverse weather condition. This may be carried out by consideration of the location of the navigable element, and whether the location lies within an affected region according to the weather data.

Data indicative of a congestion and/or a weather event that is generated may be associated with data indicative of a duration of the validity for the congestion and/or weather event. In other words, the data may be associated with data indicative of a duration for which the event may be considered to be applicable. Once this time has expired, the event may be disregarded, e.g. with the usual expected traversal speed of the element being used once more.

In embodiments in which data indicative of a congestion and/or weather event and, where applicable, its associated speed reduction is generated, various actions may be performed in relation to the generated data. The method may comprise storing data indicative of a generated congestion and/or weather event in association with data indicative of the element to which it relates, and, where applicable, data indicative of the associated reduction in speed, e.g. average speed, for the element. This step may be performed by a server, such that data indicative of the congestion and/or weather event (and the associated data) may subsequently be issued.

Where data indicative of a congestion and/or a weather event is generated by a server, the method may extend to the step of issuing the data. The step of issuing the data involves making the data available, for example, to one or more devices, which may be client devices, and/or to another server (which may or may not be a client server). Issuing the data may involve transmitting data indicative of the congestion and/or weather event and, where applicable, the associated speed reduction to the or each device or server. The data may be transmitted directly or via one or more intermediate components, such as another server. A server may automatically cause the data to be transmitted to a device or server, or may cause the data to be transmitted in response to a request received from a device or server. Thus, making the data available may involve transmitting the data or making the data available for subsequent transmission, for example, to a device or server. For example, the server may inform a device or server that the data is available, e.g. at a specific location, such that the device or server may then subsequently retrieve the data from that location.

The data indicative of a congestion and/or weather event, and the associated data, may be issued to one or more devices e.g. client devices. The or each device is preferably associated with a vehicle. The or each device may be a navigation device, such as a portable navigation device (PND) or integrated navigation device, and/or an automatic vehicle management system, e.g. ADAS system associated with a vehicle. Alternatively or additionally, the step of issuing the data may comprise the server issuing the data to another server e.g. via a communication network. The server may transmit data indicative of the data to the another server. The another server may then use the obtained data or not, depending upon its settings. The another server may in turn issue the data to one or more client devices associated with vehicles and in communication therewith. In these embodiments the another server may be arranged to receive a data indicative of a plurality of congestion and/or weather events, e.g. from one or more servers, and may select a subset of the congestion and/or weather events for issue to its client devices. The another server may be a server associated with an automobile manufacturer, navigation system provider, etc.

In any of the embodiments of the invention in which a server generates the data indicative of a jam and/or weather event, the server may broadcast the generated data. The data may be issued, i.e. output in any suitable manner to enable it to be used by any one of a plurality of servers and/or devices associated with vehicles, e.g. navigation devices and/or automatic vehicle control systems. This is in contrast to transmitting the data to a specific navigation device associated with a vehicle.

When data indicative of a congestion and/or weather event is received, e.g. by a device associated with a vehicle or a server, the data may or may not be used by the device or server depending upon the settings of the receiving device or server. For example, a congestion and/or weather event may only be output when a vehicle travels along an affected element, or is travelling along a route that incorporates the affected element.

Whether generated by a server, navigation device or otherwise, data indicative of a congestion and/or weather event message may be used in any suitable manner. Any of the steps described relating to the use of the data may be carried out by the same device or server that generated the data, or another server or device, e.g. that has received the generated data. Preferably the generated data is used by a device associated with a vehicle.

Data indicative of a congestion and/or weather event may be output to a driver, and the method extends to such a step. The data may be output in any suitable manner, including visually, audibly and/or haptically. The data may be output by a navigation device. For example, a congestion (or traffic jam) icon, or a weather warning icon may be shown in a displayed view of the path ahead of the vehicle. Preferably data indicative of a weather event is used to provide a weather warning to a driver. Alternatively, or additionally, the data may be issued to a vehicle control system associated with a vehicle for use by the system in controlling vehicle behaviour, e.g. an ADAS device. The message may be issued thereto by a server, or a navigation device associated with the vehicle. The vehicle control system may use the data to trigger certain vehicle behaviour, such as to select an appropriate speed for the vehicle, to apply the brakes to slow the vehicle, etc.

It has also been recognised by the Applicant that certain types of weather, and in particular precipitation, such as rain, sleet, snow, hail, etc, can continue to affect the traffic flow along navigable elements of the navigable network even after the particular weather event has passed. For example, snow and water can remain on the navigable element, e.g. road, path, etc, for a prolonged period of time after it has stopped snowing or raining, before it is eventually cleared due to traffic moving along the element and/or precipitation. By monitoring the current condition on navigable elements to determine whether traffic flow along the elements is still being affected by previous precipitation weather events, it becomes possible to inform users of hazardous road conditions due to recent adverse weather events, and to continue to generate data indicative of slow moving traffic due to recent adverse weather and attribute congestion events to recent adverse weather, e.g. as discussed above, even after the precipitation weather event has passed and is no longer directly affecting the navigable elements.

Thus, in accordance with a fifth aspect of the invention, there is provided a method of determining whether one or more navigable elements of a navigable network within a geographic area are still affected by a precipitation weather event, the navigable elements being represented by one or more segments of an electronic map, wherein at least some of the segments of the electronic map are each associated with data indicative of a quantity parameter for the segment, the quantity parameter being indicative of the amount of precipitation remaining on the navigable element or portion thereof represented by the segment, wherein the value of the quantity parameter varies according to a predefined function with respect to time such that the quantity parameter decreases in the absence of any precipitation weather event, said method comprising:

obtaining weather data indicative of one or more precipitation weather events in the geographic area, wherein each precipitation weather event affects at least a portion of the geographic area;

obtaining positional data relating to the movement of a plurality of devices along one or more of the navigable elements with respect to time, and using the positional data to determine a speed of travel of devices along the one or more navigable elements;

identifying one or more segments representative of navigable elements within the portions of the geographic area affected by the one or more precipitation weather events, and increasing, for each of the one or more identified segments, the value of the quantity parameter associated with the segment;

comparing, for each of the one or more identified segments, the determined speed of travel to an expected speed of travel for the segment, and decreasing the value of the quantity parameter associated with the segment based on the comparison; and generating, for each of the one or more identified segments, data indicative of whether the navigable element or portion thereof represented by the segment is still affected by the one or more precipitation weather events based on the value of the quantity parameter.

Further, in accordance with a sixth aspect of the invention, there is provided a system for determining whether one or more navigable elements of a navigable network within a geographic area are still affected by a precipitation weather event, the navigable elements being represented by one or more segments of an electronic map, wherein at least some of the segments of the electronic map are each associated with data indicative of a quantity parameter for the segment, the quantity parameter being indicative of the amount of precipitation remaining on the navigable element or portion thereof represented by the segment, wherein the value of the quantity parameter varies according to a predefined function with respect to time such that the quantity parameter decreases in the absence of any precipitation weather event, the system comprising:

means for obtaining weather data indicative of one or more precipitation weather events in the geographic area, wherein each precipitation weather event affects at least a portion of the geographic area;

means for obtaining positional data relating to the movement of a plurality of devices along one or more of the navigable elements with respect to time, and using the positional data to determine a speed of travel of devices along the one or more navigable elements;

means for identifying one or more segments representative of navigable elements within the portions of the geographic area affected by the one or more precipitation weather events, and increasing, for each of the one or more identified segments, the value of the quantity parameter associated with the segment;

means for comparing, for each of the one or more identified segments, the determined speed of travel to an expected speed of travel for the segment, and decreasing the value of the quantity parameter associated with the segment based on the comparison; and means for generating, for each of the one or more identified segments, data indicative of whether the navigable element or portion thereof represented by the segment is still affected by the one or more precipitation weather events based on the value of the quantity parameter.

It will be appreciated that any feature described by reference to the fifth aspect of the invention may equally be applied to embodiments in accordance with the sixth aspect of the invention and vice versa. The means for carrying our any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the quantity parameters, the positional data, etc.

Furthermore, the present invention in these further aspects may include any or all of the features described in relation to any or all of the aspects and embodiments discussed above, and vice versa, to the extent that they are not mutually exclusive.

Thus, in accordance with the invention, segments of an electronic map representing real world navigable elements of a navigable network are associated with data indicative of a respective quantity parameter. A plurality of the segments, and preferably each segment of the electronic map is associated with such data. The quantity parameter has a value which is indicative of the amount of precipitation remaining on the navigable element or portion thereof represented by the segment, and thus, in embodiments, will typically have a value of zero when there is no precipitation remaining on the element. As will be appreciated the quantity parameter is not typically a measure of the actual amount of precipitation on the navigable element, but is instead a value representative of the amount relative to a normal, dry condition. The quantity parameter is a dynamically varying parameter. The value of the quantity parameter for a given segment will increase over time when precipitation from a weather event falls on the navigable element or portion thereof represented by the segment. As will be appreciated the increase in the value will stop when the weather event moves on and new precipitation is no longer falling on the element represented by the segment. In addition, the value of the quantity parameter for a given segment will decrease over time, assuming the parameter is not already at zero. This aging reflects that the level of standing precipitation will reduce in the absence of any new precipitation weather events, and also reduces the value of the quantity parameter even when no or insufficient positional data is received for a segment. The Applicant has realised that by monitoring the speed of devices, e.g. vehicles. along the navigable elements based on live positional data, and comparing the determined speed to an expected speed, e.g. one based on historic data, then it is possible to make a judgement as to whether precipitation remains on the navigable element and continues to have an effect on traffic flow. In other words, when measured speeds for a navigable element are less than an expected speed, then it can be assumed that this reduction in speed is due to precipitation remaining on the navigable element. The value of the quantity parameter is decreased based on the comparison between the measured speed and the expected speed, such that the value decreases faster when one or more devices are measured travelling at or close to the expected speed relative to one or more devices that are measured travelling at a speed that is much less than the expected speed. Therefore, after a certain period of time, and as a result of the aging and/or due to obtained positional data, the quantity parameter reaches zero (unless a new weather event causes an increase in the parameter). At this time, then it can be said that precipitation from a recent weather event is no longer affecting traffic flow on the navigable element.

As discussed above, the weather data is indicative of weather conditions applicable to a current time, and thus the weather data preferably comprises live weather data. In the present invention according to the present aspects, the weather data is indicative of one or more precipitation weather events, such as rain, hail, snow, etc, that cover at least a portion of the geographic area.

In the present invention, the obtained positional data is used to determine a speed of travel for one or more segments. The positional data used in accordance with the invention is positional data relating to the movement of a plurality of devices along the or each navigable element with respect to time. The method may comprise obtaining positional data relating to the movement of a plurality of devices with respect to time in the network of navigable elements, and filtering the positional data to obtain positional data relating to the movement of a plurality of devices along a given navigable element with respect to time in the applicable direction. The step of obtaining the positional data relating to the movement of devices along a navigable element may be carried out by reference to the electronic map data indicative of the navigable segment representing the navigable element of the network. The method may involve the step of matching positional data relating to the movement of devices in a geographic region including the network of navigable elements to at least the or each navigable segment of the electronic map that is being considered in accordance with the invention.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The method of the present invention preferably involves obtaining and using "live" positional data relating to the movement of a plurality of devices with respect to time along the or each navigable element. Live data may be thought of as data which is relatively current and provides an indication of relatively current conditions on each navigable element. The live data may typically relate to the conditions on the elements within the last 30 minutes, 15 minutes, 10 minutes or 5 minutes.

As will be appreciated the speed of travel determined from the live positional data may be based on the movements of a single device (if positional data was obtained from only a single device in the last time window, e.g. the last 5 minutes) or it may be based on the movements of a plurality of devices (if positional data was obtained from a plurality of devices in the last window); the speed of travel in this latter case being a measured average speed.

As discussed above, the expected speed for a segment may, in some embodiments, be a historical speed of travel for the navigable element or portion thereof represented by the segment. Preferably, in the context of the present aspects, the historical speed of travel is a historic average speed, e.g. determined from historical positional data as discussed above. The expected speed of travel for a segment will typically vary with time, and a segment will have a plurality of expected speeds associated therewith; each expected speed being in respect of a different period of time. Thus, in embodiments, the expected speed of travel used in the comparison is selected for the appropriate period of time in which the speed of travel is measured.

In preferred embodiments the increase of the quantity parameter as a result of a precipitation weather event takes the form of a discrete step in the value of the parameter, i.e. a discrete jump. The magnitude of the step may be set as desired. In some embodiments the magnitude of the discrete step is based on the severity and/or type of the precipitation weather event. For example, the discrete step is preferably proportional to the severity, e.g. such that the discrete step is larger for more a severe precipitation event to reflect that a larger amount of precipitation would fall within a certain period of time.

Similarly, in preferred embodiments, the decrease of the quantity parameter due to positional data takes the form of a discrete step in the value of the parameter, i.e. a discrete drop. The magnitude of the step may be set as desired. In some embodiments the magnitude of the discrete step is based on the magnitude of the difference between the measured speed and the expected speed as determined in the comparison. For example, the discrete step is preferably inversely proportional to the magnitude of the difference, e.g. such that the discrete step is larger for smaller differences. This reflects that the closer the measured speed is to the expected speed then the smaller the level of precipitation remaining on the navigable element. In other words, the quantity parameter reduces to zero quicker when the measured speed is different to the expected speed by a first value in comparison to when the measured speed is different to the expected speed by a second value; the second value being larger than the first value.

As discussed above, the value of the quantity parameter decreases over time according to a predefined function, i.e. a decay function, in the absence of any precipitation weather event, to reflect that the level of standing precipitation will reduce due to in part to evaporation and the movement of vehicles along the navigable network. The predefined decay function that is used to age the quantity parameter associated with a segment may be of any suitable form. For example, the decay function may be at least one of: a linear function, an exponential function, and a polynomial (e.g. quadratic, cubic, etc) function. In some embodiments, each modification of the value of the quantity parameter associated with a segment due to the comparison between the determined speed of travel and the expected speed of travel for the segment, i.e. due to positional data, provides a discrete step in the value of the quantity parameter to provide a new starting point from which the value of the parameter then decays with respect to time.

The predefined decay function, which ages the quantity parameter for a segment can, in preferred embodiments, be based on temperature data for the segment. The temperature data is preferably indicative of a temperature at the location of the navigable element represented by the segment at a current time, and thus the temperature data preferably comprises live temperature data. The dependence of the decay function on temperature reflects that the standing precipitation on the navigable element, e.g. water, snow, etc, will disperse, e.g. melt, evaporate, etc, more rapidly, and thus have a reduced effect on the flow of traffic along the navigable element, as the temperature increases. In other words, if the temperature is below or at freezing, any snow or water on a navigable element will remain on the navigable element for a substantially longer time than if the temperature is above freezing. Accordingly, and as will be appreciated, the dependence of the decay function on the temperature is such that the quantity parameter reduces to zero quicker when the temperature is at a first value in comparison to when it is at a second value; the first value being higher than the second value. In other words, the rate of decay of the quantity parameter (due only to the predefined decay function) is proportional to the temperature.

The method can therefore comprise obtaining temperature data, and using the temperature data to determine a current temperature for at least each of the one or more identified segments representative of navigable elements within the portions of the geographic area affected by the one or more precipitation weather events. In embodiments, a current temperature can be obtained for each of the segments of the electronic map. The temperature data may be obtained from any suitable source or sources of temperature data. The temperature data can, for example, be obtained from the same source as the precipitation data (or other weather data); although it is envisaged that the temperature data could be obtained from a different source. For example, the temperature data may be obtained from a weather server. The server may be a different server may be a different server to a server that, in preferred embodiments, performs the method of the present invention. The temperature data may be indicative of one or more regions, each region having the same temperature, and each region being representative of a geographic area. Accordingly, the method can comprise identifying the one or more segments within each region of the temperature data, and assigning the temperature indicated by a region to the one or more identified segments within the region.

In the present invention data indicative of whether the navigable element or portion thereof represented by a segment is still affected by a prior precipitation weather event is generated based on the value of the quantity parameter for the segment. Preferably such data is generated for a plurality of segments of the electronic map.

The data may be an indicator, such as a flag, associated with the relevant segment indicating that it is still affected by precipitation from a previous weather event that has now moved on. This indictor, e.g. flag, may be the same as that used to indicate a segment is affected by a weather event, such that the indication is provided when the weather event starts affecting the navigable element or portion thereof represented by the segment and removed, not when the weather event moves on and stops directly affecting the navigable element or portion thereof, but only when there is no longer an effect on the traffic flow due to the weather event, i.e. when the quantity parameter decreases to zero. Alternatively a first indictor, e.g. flag, may be associated with a segment for the period of time from when a weather event starts affecting the affecting the navigable element or portion thereof represented by the segment to when the weather event moves on, i.e. when the quantity parameter stops increasing, and a second indictor, e.g. flag, may be associated with the segment for the period of time from when the weather event moves on to when there is no longer an effect on the traffic flow due to the weather event, i.e. when the quantity parameter decreases to zero.

In other embodiments the data may be indicative of the current value of the quantity parameter, such that, for example, an icon can be shown to user indicting the amount of precipitation remaining on the navigable element or portion thereof represented by the segment.

The data may additionally include information about the type of precipitation weather event that has affected traffic flow on the navigable element or portion thereof as represented by the segment.

In embodiments, the data indicative of whether the navigable element or portion thereof represented by a segment is still affected by a prior precipitation weather event can be used to generate a message identifying a stretch of the navigable network, e.g. comprising at least a portion of one or more navigable elements, and represented by one or more segments. The stretch does not necessarily need to be indicative of a congestion and/or weather event, since despite devices traversing the stretch at a speed slower than the expected speed, the measured speed may not be less than the free flow speed by the amount needed to indicate a weather event or the larger amount needed to indicate a congestion event. This would allow a user to be informed of a stretch of the navigable network having conditions, e.g. standing water, snow, etc, that may require the user to take additional care. In other embodiments, the stretch can be indicative of a weather event, i.e. where the current speed of travel along the element is reduced relative to the free flow speed for the element, and wherein said reduction is less than a threshold associated with identifying a congestion event. This would allow weather events (and thus any associated delays) to still be identified even after the adverse weather conditions causing the weather event have moved on, since the quantity parameter can be used to provide evidence as to why traffic flow is reduced on the navigable element.

Thus, in accordance with another aspect of the invention, there is provided a method of identifying navigable elements along which traffic flow remains affected by a previous precipitation based weather condition in a navigable network within a geographic area, the method comprising:

obtaining data indicative of whether a navigable element is still affected by the previous precipitate based weather condition based on a quantity parameter representative of the amount of precipitation remaining on the navigable element;

obtaining positional data relating to the movement of a plurality of devices along the navigable element with respect to time;

using the positional data to determine a current speed of travel along the navigable element;

comparing the determined current speed of travel to a free flow speed for the navigable element;

determining whether the navigable element remains affected by the previous precipitation based weather condition, when said comparison indicates the current speed of travel along the element is reduced relative to the free flow speed for the navigable element, and wherein said reduction is less than a threshold associated with identifying a congestion event as affecting the navigable element; and generating data indicative of a weather event affecting traffic flow along the element, when the obtained data indicates the navigable element is still affected by the previous precipitation based weather condition.

The present invention extends to a system for carrying out a method in accordance with the above aspect and any embodiments thereof.

Furthermore, the present invention in these further aspects may include any or all of the features described in relation to any or all of the aspects and embodiments discussed above, and vice versa, to the extent that they are not mutually exclusive.

In other embodiments, the stretch can be indicative of a congestion event with the quantity parameter being used to determine whether the congestion event can be attributed to a weather event even after the adverse weather conditions causing the weather event have moved on, since the quantity parameter can be used to provide evidence as to why traffic flow is reduced on the navigable element.

Thus, in accordance with another aspect of the invention there is provided a method of identifying navigable elements along which traffic flow remains affected by a previous precipitation based weather condition in a navigable network within a geographic area, the method comprising:

obtaining data indicative of whether a navigable element is still affected by the previous precipitate based weather condition based on a quantity parameter representative of the amount of precipitation remaining on the navigable element;

obtaining positional data relating to the movement of a plurality of devices along the navigable element with respect to time, and using the positional data to identify a congestion event as affecting traffic flow along the navigable element;

determining whether the cause of the congestion event is attributable to the previous precipitation based weather condition using one or more attributes of the congestion event, when the obtained data indicates the navigable element is still affected by the previous precipitation based weather condition; and associating data indicative of the previous precipitation based weather condition with the identified congestion event, when the cause of the congestion event is determined to be attributable to the previous precipitation based weather condition.

The present invention extends to a system for carrying out a method in accordance with the above aspect and any embodiments thereof.

Furthermore, the present invention in these further aspects may include any or all of the features described in relation to any or all of the aspects and embodiments discussed above, and vice versa, to the extent that they are not mutually exclusive.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to a segment or element. Therefore association may for example be achieved by means of a reference to a side file, potentially located in a remote server.

The present invention may be implemented in relation to navigable elements of any type. Preferably the navigable elements are road elements (of a road network). In some embodiments the navigable element(s) are elements of a highway, but it will be appreciated that the techniques are applicable to any type of road element, or indeed other type of navigable element, where appropriate positional data exists or can be determined. While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. The present invention is therefore applicable to detecting a closure of any navigable element.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining the existence of a weather event affecting traffic flow along a road element in a road network. The ability to determine when a reduction in traffic flow along a road element may be attributed to adverse weather conditions is useful, providing the ability to generate data allowing drivers to be warned of the weather event.

An embodiment of the invention will now be described in relation to FIG. 1. This embodiment of the invention may be used to detect the presence of a weather event affecting flow along a road element in a road network. The steps of the method are preferably carried out by a server.

Figure 1:
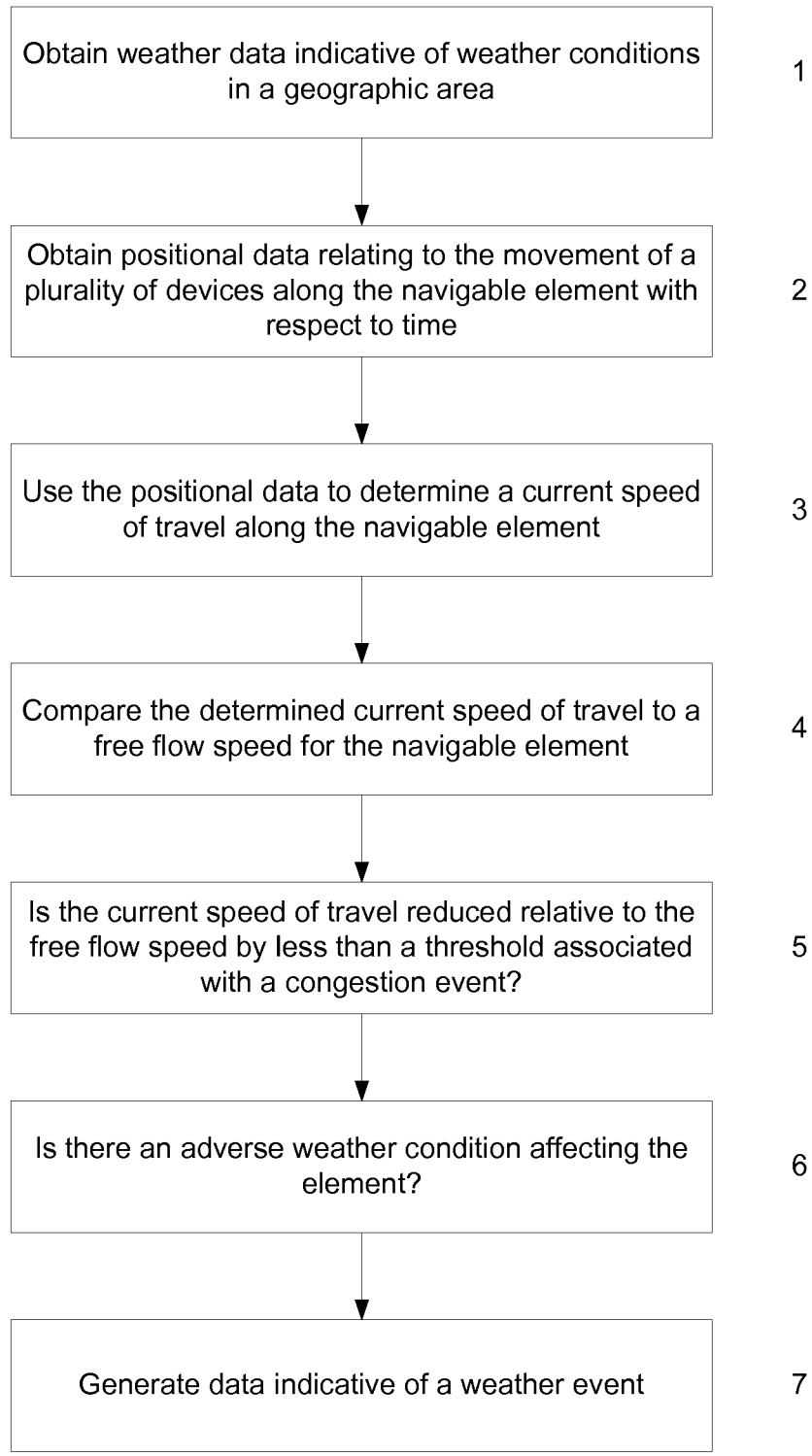
FIG. 1 is a flow chart illustrating the steps of a method for determining when traffic flow along a road element is affected by an adverse weather condition in accordance with an embodiment of the invention.

The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data. The positional data may be matched to road segments of a digital map representing the network of road elements.

In step 1, weather data is obtained by a server; the weather data being indicative of weather conditions in a geographic area including at least a portion of the road network. In step 2, the server obtains positional data.

Next, in step 3, the server determines an average speed of travel, of vehicles along a road element in a given time period. The average speed of travel is determined using live vehicle probe data for the given time period. Thus, the average speed of travel can be considered to be a current speed of travel.

In step 4, the server compares the determined average speed for the given period to a free flow speed for the element. The free flow speed is indicative of the speed that vehicles are expected to travel along the element in under conditions in which there is no, or substantially little traffic. The free flow speed is based upon historical positional data relating to the movement of vehicles along the element. The free flow speed may be determined using digital map data that correspond to the element. For example, the free flow speed may be included as an attribute associated with the one or more segments representing the road element.

Figure 3:
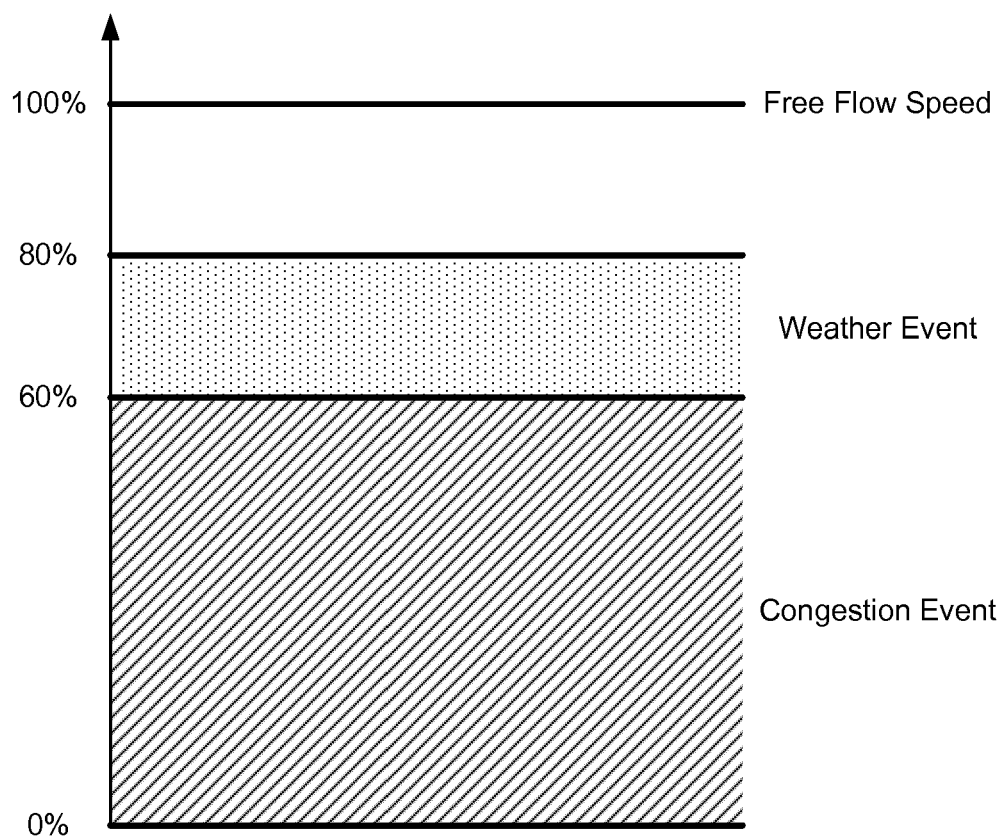
FIG. 3 illustrates the exemplary thresholds used to identify weather and congestion events.

If a reduction in the live average speed relative to the free flow speed for the element is less than a first threshold associated with a congestion event, then a determination is made as to whether the element is affected by an adverse weather condition—steps 5 and 6. As shown in FIG. 3, the first threshold may correspond, for example, to a 40% reduction in average speed.

If the element is determined to be affected by an adverse weather condition, then a weather event is generated—step 7. Examples of adverse weather conditions include ice, wind, fog and rain (or other forms of precipitation). Optionally, and again as shown in FIG. 3, a determination may be made as whether the speed reduction is more than a second threshold, and a weather event generated only in the case when the speed reduction is more than the second threshed and less than the first threshold. The second threshold may correspond, for example, at a 60% reduction in average speed.

The weather event includes a type of the adverse weather condition or conditions affecting the element, and an indication of the element involved. The type of weather condition may be indicated using a code. The weather event also includes data indicative of the reduction in speed relative to the free flow speed that exists along the element. The weather event may also be indicative of a start point and length of the affected portion of the element, and a start time and duration (or end time) for the event.

Figure 2:
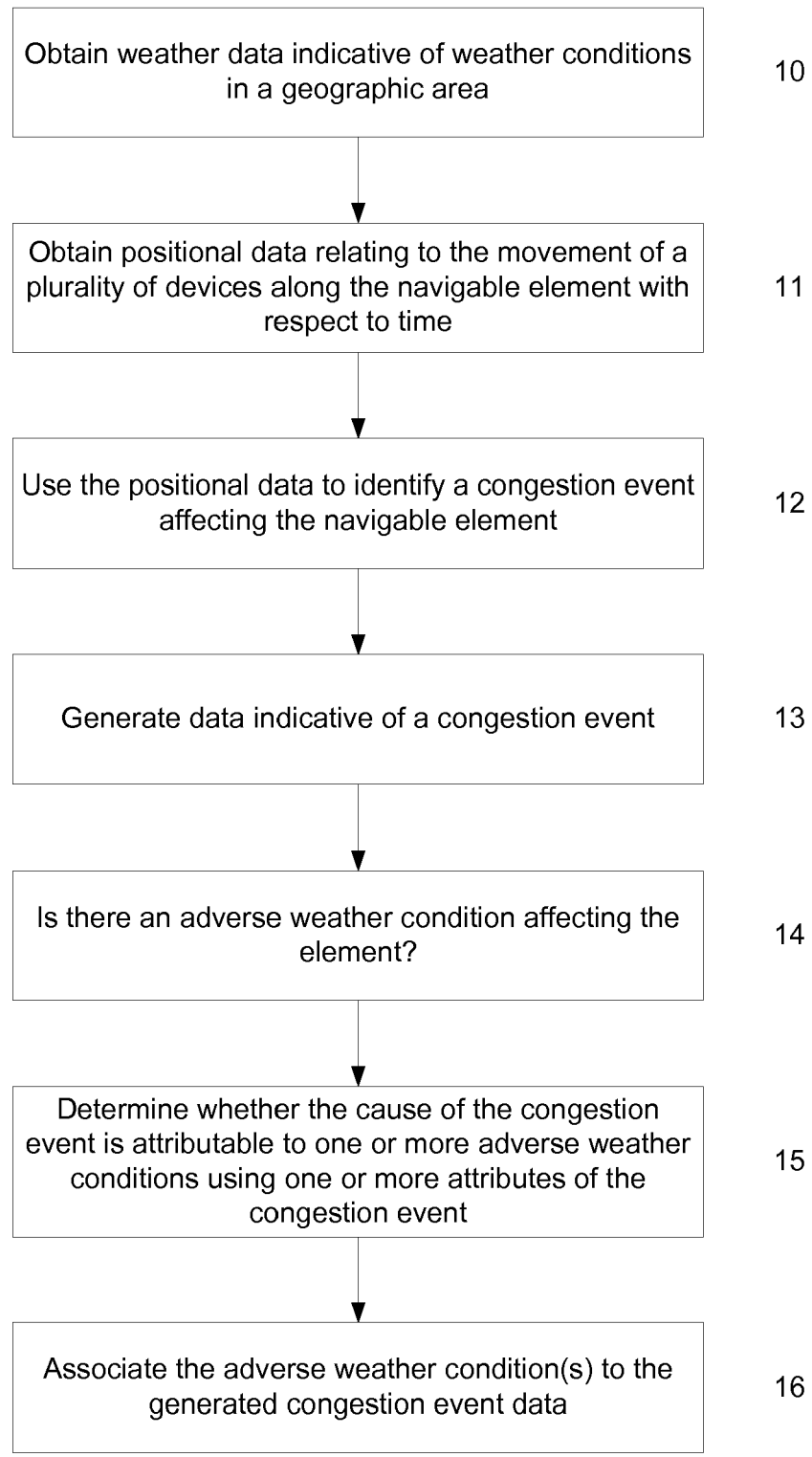
FIG. 2 is a flow chart illustrating the steps of a method for determining when a congestion event is caused by an adverse weather condition in accordance with an embodiment of the invention.

As will be appreciated, when the determined speed reduction relative to the free flow speed is more than the first threshold, then a congestion event, such as a traffic jam, is inferred. The method shown in FIG. 2 illustrates how a determination can be made as to whether the cause of such a congestion event is due to one or more adverse weather conditions.

In step 10, weather data is obtained by a server; the weather data being indicative of weather conditions in a geographic area including at least a portion of the road network. In step 11, the server obtains positional data, and the positional data is used to identify a congestion event affecting a navigable element, e.g. as described above (step 12).

In step 14, a determination is made as to whether there is one or more adverse weather conditions affecting the element. Next, in step 15, one or more attributes of the congestion event, such as the speed of travel within the congestion event (such as the current speed determined using the positional data as described above) and/or a start time of the congestion event (e.g. the time at which the determined current speed was reduced relative to the free flow speed by more than the first threshold), are used to determine whether the cause of the congestion event can be attributed to the one or more adverse weather conditions.

Any one or ones of the following checks may be performed to determine whether to attribute the cause of a congestion event to an adverse weather condition. Such verifications may include consideration of a variance of speeds of travel along the element according to the live data. It has been found that the speeds of vehicles travelling along an element affected by an adverse weather condition tend to be relatively uniform. Additionally, a check may be performed to see whether the reduction in flow commenced before the adverse weather condition started to affect the element. This may be determined by consideration of a start time for the adverse weather condition, if such data is provided. If the reduction in flow commenced prior to the adverse weather condition, it may be assumed that the reduction in flow most likely is not attributable to the weather conditions. Another check might involve determining whether there are other elements having a similar reduction in flow within proximity to the element. If so, it is likely that this is caused by adverse weather conditions affecting the general area.

Finally, the live average speed for the element may be compared to an expected average speed and/or a jam speed for the element. This may be carried out by reference to a historical speed data; such data may be associated with digital map data indicative of a segment representing the element. If the current speed differs significantly, e.g. by more than a predetermined amount, from the expected average speed and/or a jam speed, then it is likely that the congestion is as a result of adverse weather conditions.

Figure 7:
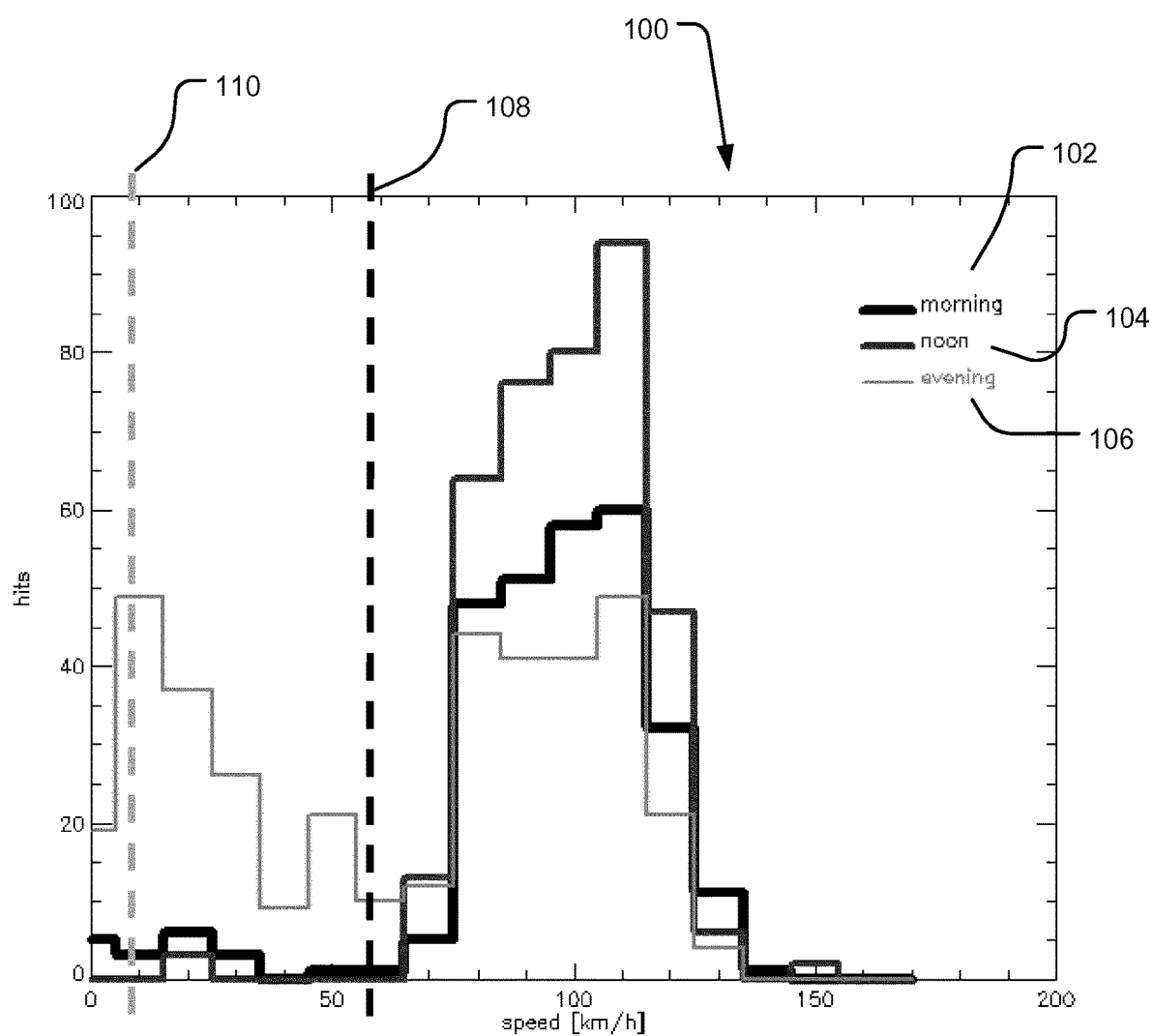
FIG. 7 is an average speed of travel across a segment histogram for three different time periods, 'morning', 'noon' and 'evening'.

The jam speed for an element is indicative of an historic average speed of travel along the element when a congestion event is present on the element, and preferably at times when the congestion is not attributable to weather. Referring now to FIG. 7, this shows generally at 100 a histogram of average speeds of travel across a segment for three particular periods, morning 102, noon 104 and evening 106. The average speeds of travel across a segment, which may have been calculated from raw data such as historic travel times across the segment, are examples of historic travel data. The histogram 100 may be considered to represent historic data in the sense that the data recorded is not live data. The data is not therefore a direct result of raw data collection occurring substantially at the current time, recording actual events on the road segment within for example the last fifteen minutes. The data may however be used to predict what may be occurring on the segment at the present time in view of patterns occurring in traffic levels and behaviour.

The histogram 100 suggests that in the morning 102 and noon 104 periods there was relatively little slow moving traffic, whereas in the evening period 106 there was substantially more relatively slow moving traffic. The histogram 300 further suggests that in all three periods 102, 104 and 106 there was a substantial quantity of relatively fast moving traffic.

Shown on histogram 100 is a jam threshold speed 108 selected to be at 60 km/h. The jam threshold speed is an example of a jam condition. The jam threshold speed is the average speed of travel across the segment below which the travel is considered to have been jammed. In this embodiment the jam threshold speed was selected simply on the basis of a subjective view on what average speed should be considered jammed over the particular segment. In other embodiments however the jam threshold speed may be selected according to alternative criteria (e.g. a percentage of the average speed of travel across the segment during a period in the early morning, when the influence of other vehicles may be negligible, i.e. a free-flow speed). In other words, the jam threshold speed may be a selected percentage of the free-flow speed for the segment, the free-flow speed being the average speed of travel across the segment recorded during a selected low traffic period. As will be appreciated, once a jam threshold speed has been defined, all average speeds of travel across the segment below this speed are considered jammed.

Also shown on the histogram 100 is a jam speed 110 of 10 km/h. As can be seen the jam speed 110 is time independent, i.e. the same jam speed 110 is provided for all three periods 102, 104 and 106. In this embodiment the jam speed 110 has been selected to be the mode of hits below the jam threshold speed 108. It is therefore an indication of the most likely average speed of travel across the segment when there is a jam. In other embodiments the jam speed 110 may be defined differently and this is discussed later.

Figure 8A:
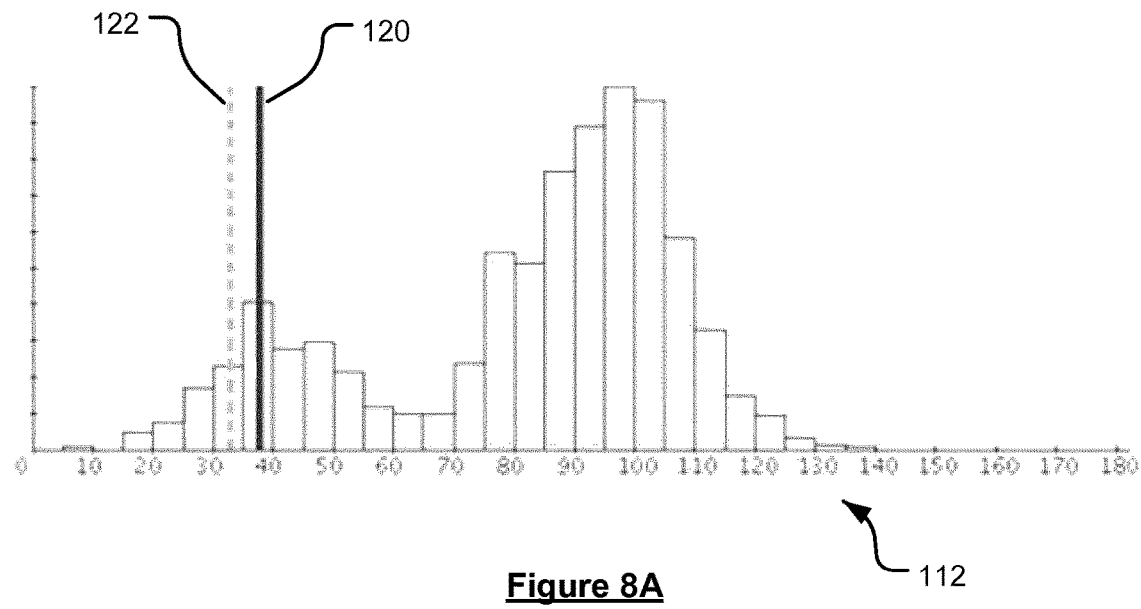
FIGS. 8A, 8B, 8C and 8D show average speeds of travel across a segment histogram identifying possible jam speeds.
Figure 8B:
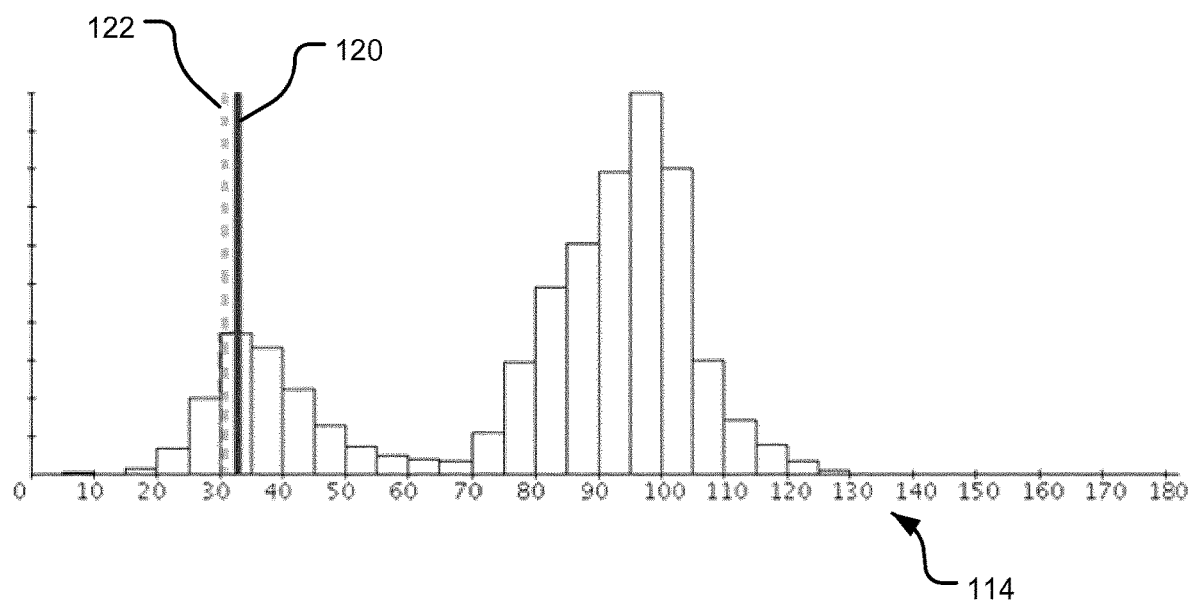
Figure 8C:
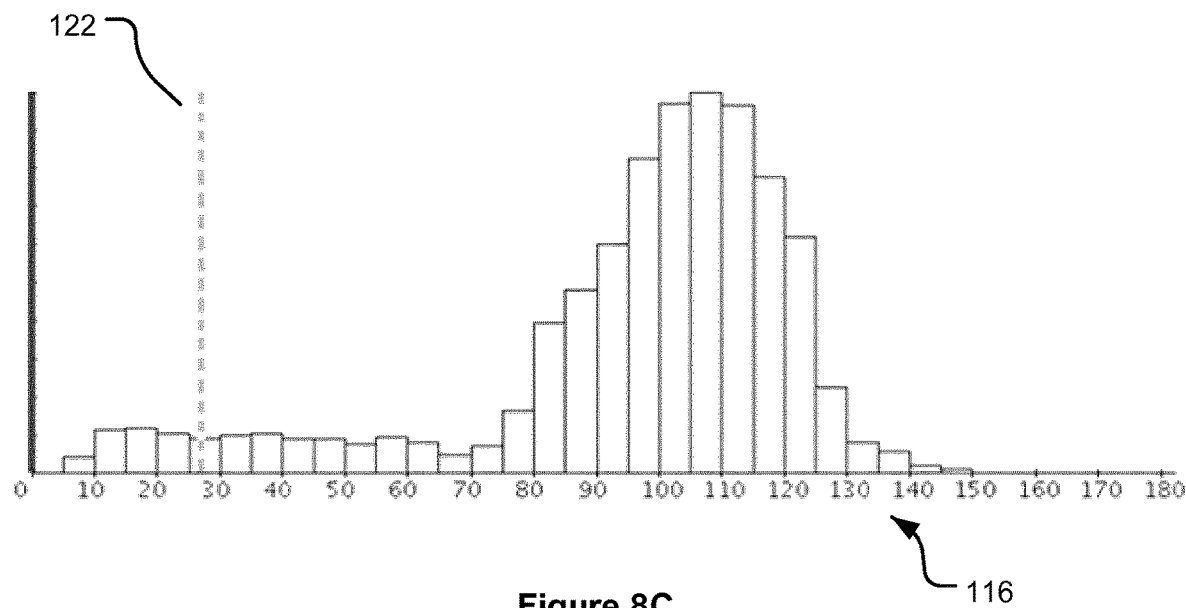
Figure 8D:
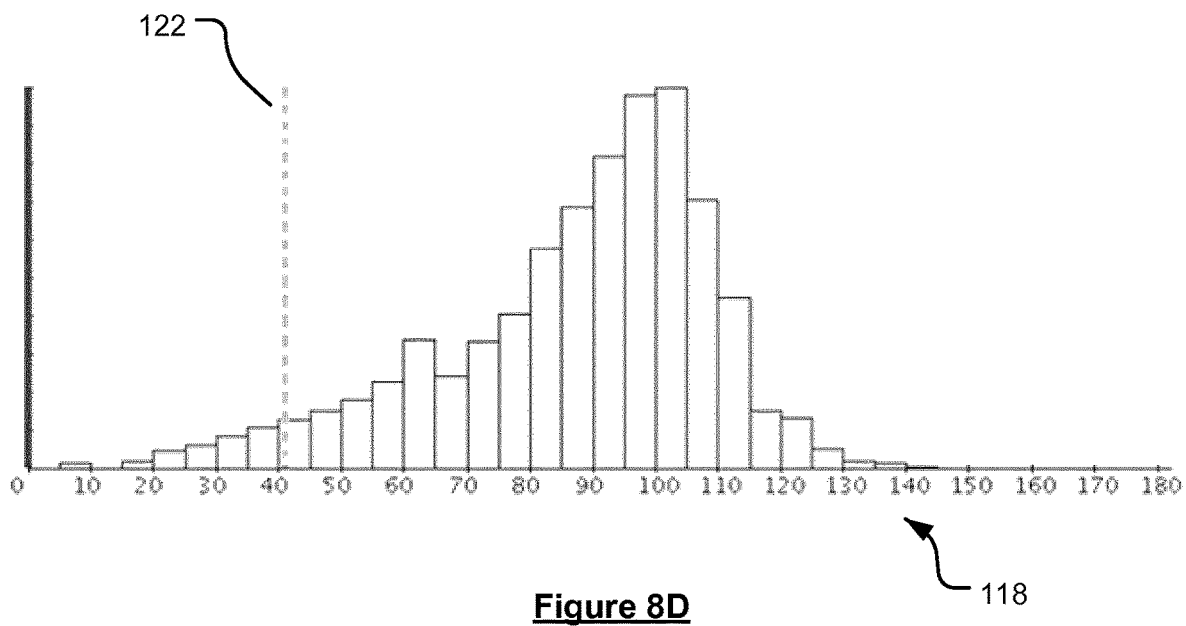

Referring now to FIGS. 8A to 7D, alternative criteria for defining the jam speed are illustrated. FIG. 8A shows a histogram 112, FIG. 8B a histogram 114, FIG. 8C a histogram 116 and FIG. 8D a histogram 118. These histograms 112, 114, 116 and 118 each show historic average speeds of travel across a segment for a single period. As with histogram 100 of FIG. 7 they all use historic data.

In both histograms 112 and 114 there is a clear low speed mode 120. Assuming that the jam threshold speed has been selected to be above the low speed mode 120, the low speed mode 120 may be particularly suitable for selection as the jam speed. For comparison a fifth percentile 122 is also shown in both histograms 112 and 114.

In both histograms 116 and 118 there is either no low speed mode or it is far less obvious. In this case in particular a percentile such as the fifth percentile 122 may be used as the jam speed.

In other embodiments there are still further options for selecting the jam speed. The jam speed may for example be an average of all average speeds of travel across the segment falling below the jam threshold speed.

Referring again to FIG. 2, once a determination has been that a congestion event can be attributed to one or more adverse weather conditions, data is generated in respect of the congestion event, and associated with the data is an indicative of the applicable weather condition or conditions—step 16.

Determining whether there is an adverse weather condition affecting an element, and if so, its type, may be carried out in a number of ways. The determination is based upon live weather data, which may be stored in a repository of a remote weather server. In other arrangements the weather data may be based at least in part on predicted weather conditions. The server stores data indicative of weather conditions affecting regions in the geographic area including the road network. The method may involve accessing the weather data in order to look up whether there is an adverse weather condition affecting the particular road element, and if so, its type. In other embodiments, road elements of the road network which are affected by an adverse weather condition are associated with an indication, e.g. flag indicative of this, and of the type of weather condition involved. Determining whether a road element is affected by an adverse weather condition may then simply involve determining whether the element is associated with a flag indicative of this. The method may involve initially using the weather data to associate such indications, e.g. flags, with affected elements prior to performing the steps of the present invention. It will be appreciated that a determination as to whether there is an adverse weather condition affecting an element may be carried out in any suitable manner using appropriate weather data, providing data indicative of weather conditions and the locations affected by the conditions. In some embodiments the weather data may be in relation to navigable segments of a digital map representing the elements. However, in other arrangements, it may be necessary to use a position of a road element of interest to look up the data, potentially using some form of location referencing system, which may be map agnostic. The weather data will include location data for any weather conditions which may be used to determine the affected location in any other location referencing system.

Once a road element has been determined as being affected by a congestion and/or weather event, and the appropriate data indicative thereof generated, the server may carry out a number of steps, such as one or more of: storing the data; and transmitting the data to another server, or directly to navigation devices or advanced driver assistance systems (ADAS) associated with vehicles for use, for example, in providing alerts to a user. The data may be provided as part as a traffic update transmission.

Figure 4:
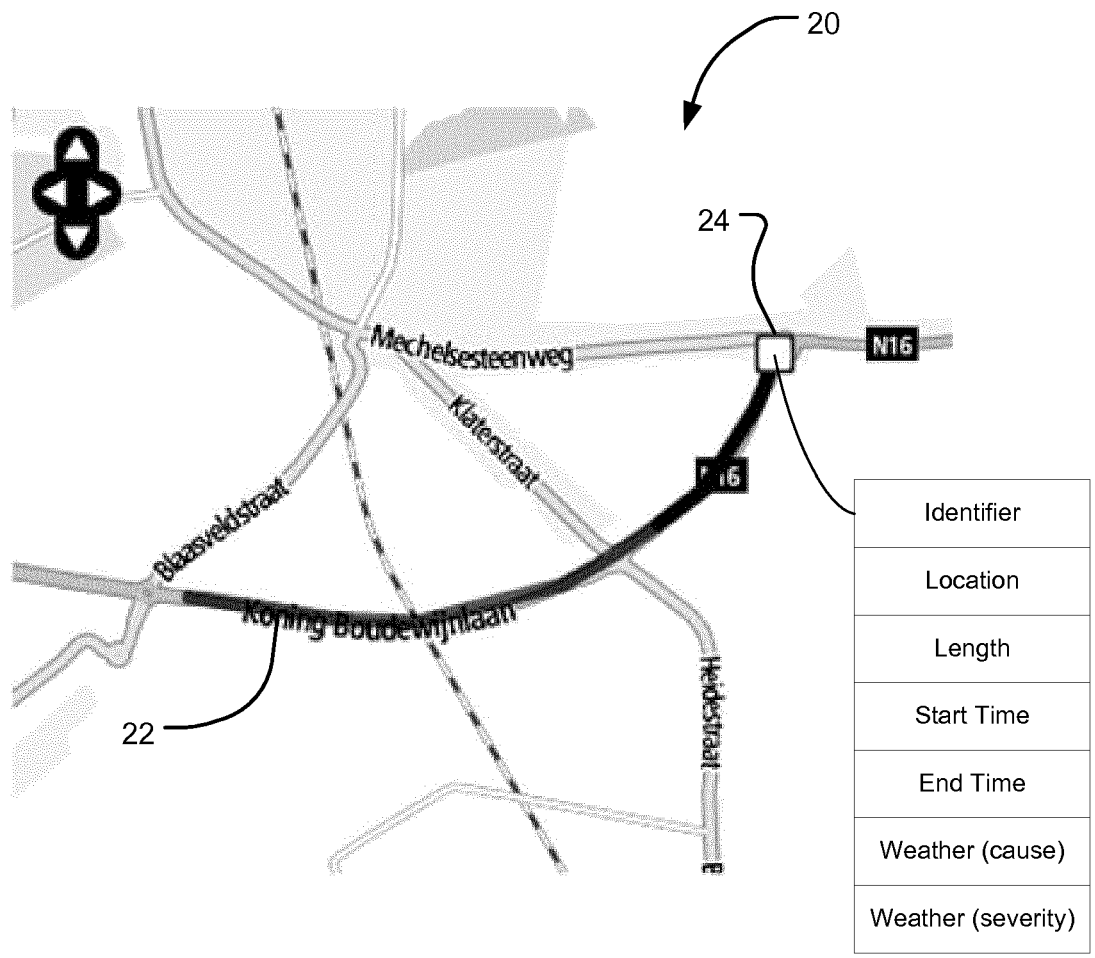
FIG. 4 shows a visual representation of a digital map with an indication of a portion of a road element affected by a weather event.
Figure 4:
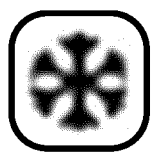
Figure 4:
Figure 4:
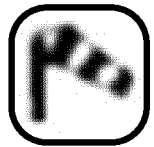
Figure 4:

The congestion and/or weather event data that is generated, and which may be received and used to provide a warning to a user includes: data indicative of an identifier for the event; a location of the event, e.g. of a tail or other reference point thereof; a length of the affected portion; a start time of the event and an associated duration (e.g. indicated by an end time); a type of the weather condition, such as ice, fog, wind, precipitation (e.g. rain, snow, etc); and a severity of the weather condition. The location, start time and duration of an event may be used by a device, e.g. navigation device, to determine whether the event is still applicable, for example, for the purposes of calculating a route to a destination. FIG. 4 shows a visual representation of such a congestion or weather event on a digital map. Here the information regarding the length and location of the affected portion has been used to shade the affected portion 22 of a road element to indicate a region of reduced flow. The head of the portion 24 is marked with an icon 24; although it will be appreciated that the tail of the portion 24 could equally be shown. The icon may be indicative of the type of adverse weather condition. Examples are shown below the map, indicative of ice, wind, fog and rain.

FIG. 4 illustrates a display 30 of a navigation device showing a warning relating to an upcoming weather or congestion event. The portion of the road network affected by the event is shown by the shaded portion 36. The current position of the vehicle on the road network is represented by the current position marker 34, and thus it can be seen that the device is on a portion of the road network affected by the event. A user can, for example, by touching the shaded portion 36 cause a window 32 to be displayed providing more detailed information about the event. In this instance, the window 32 shows the weather type that caused the event, i.e. "fog, bad weather', together with the length of the event and an estimated delay in travel time caused by traversing the event.

Figure 5:
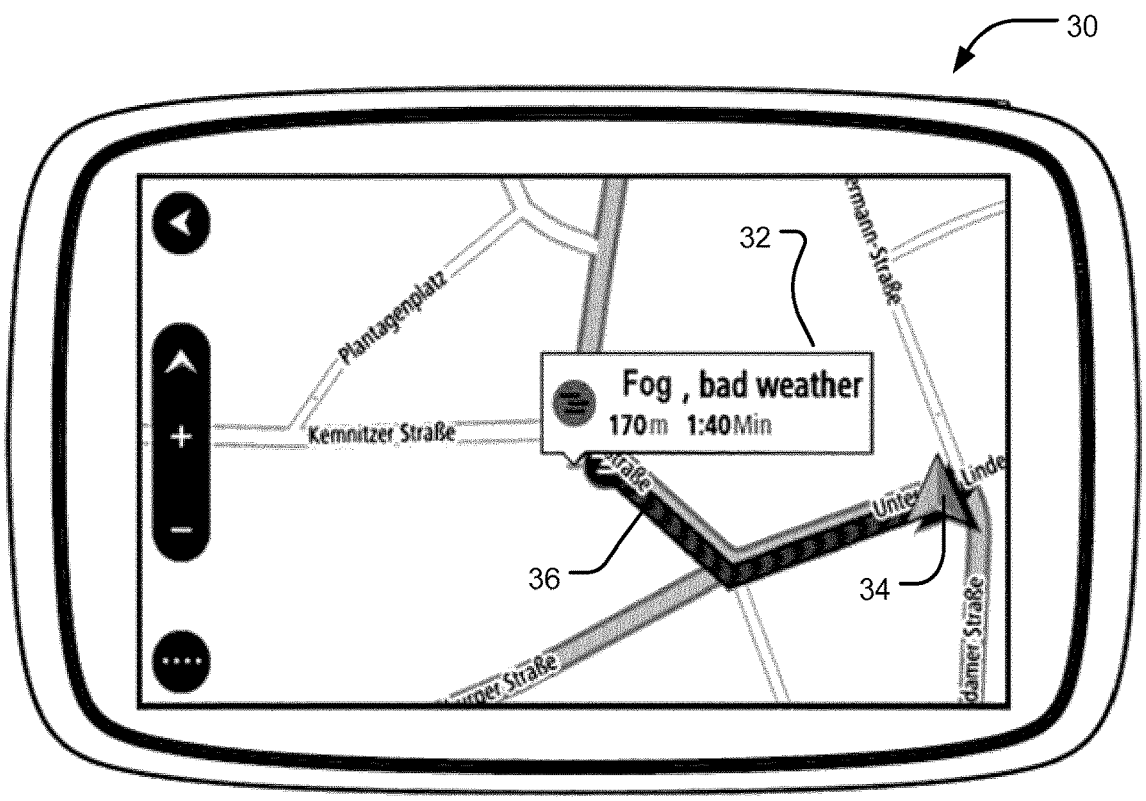
FIG. 5 illustrates a first exemplary display of a navigation device showing a warning relating to an upcoming weather event.
Figure 6:
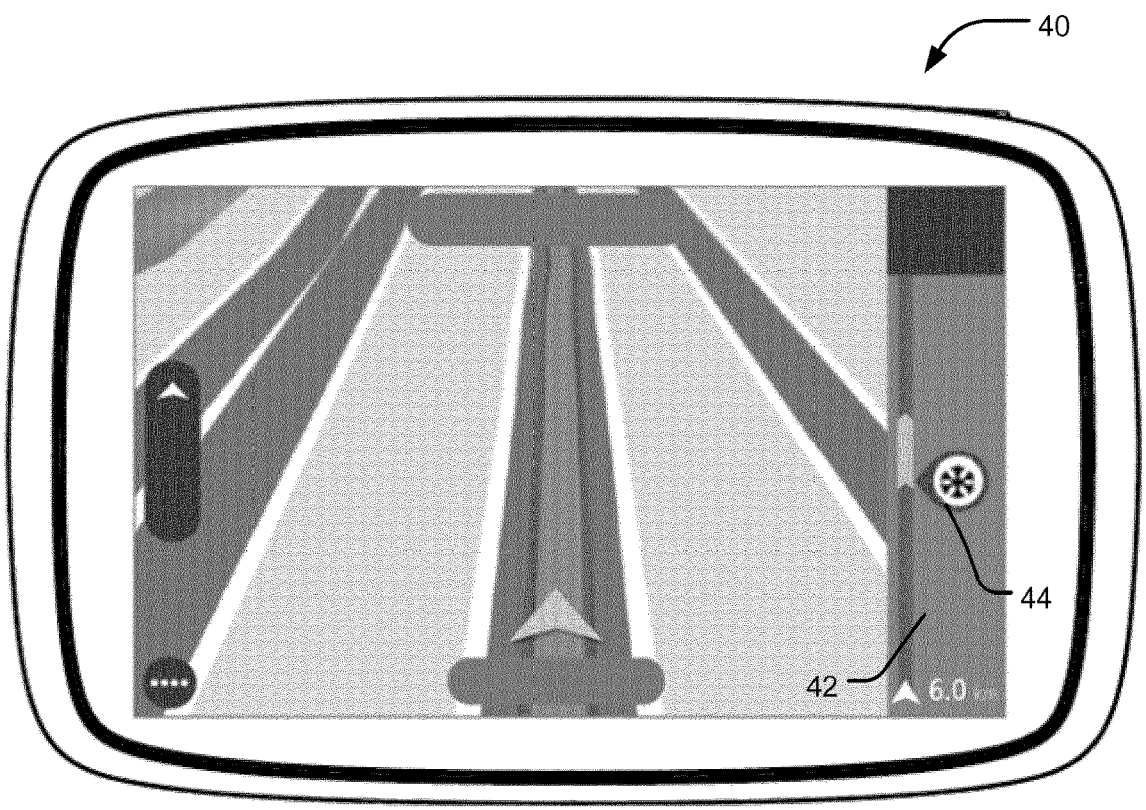
FIG. 6 illustrates a second exemplary display of a navigation device showing a warning relating to an upcoming weather event.

FIG. 5 illustrates a display 40 of a navigation device showing a warning relating to an upcoming weather or congestion event. The warning is shown on a schematic representation of the route being followed 42; the current position of the vehicle being shown by icon 43 and the location of the upcoming event, which in this instance is 6.0 km from the device's current position, being shown by the icon 44. The symbol within the icon 44 is indicative of the weather type causing the event, i.e. ice.

It has been recognised that certain types of weather, and in particular precipitation, such as rain, snow, hail, etc, can still affect traffic flow on roads of a road network for some time after the precipitation has stopped falling due to the precipitation collecting and lying on the road. The method may therefore further include monitoring the conditions on roads after precipitation has moved on.

Figure 9:
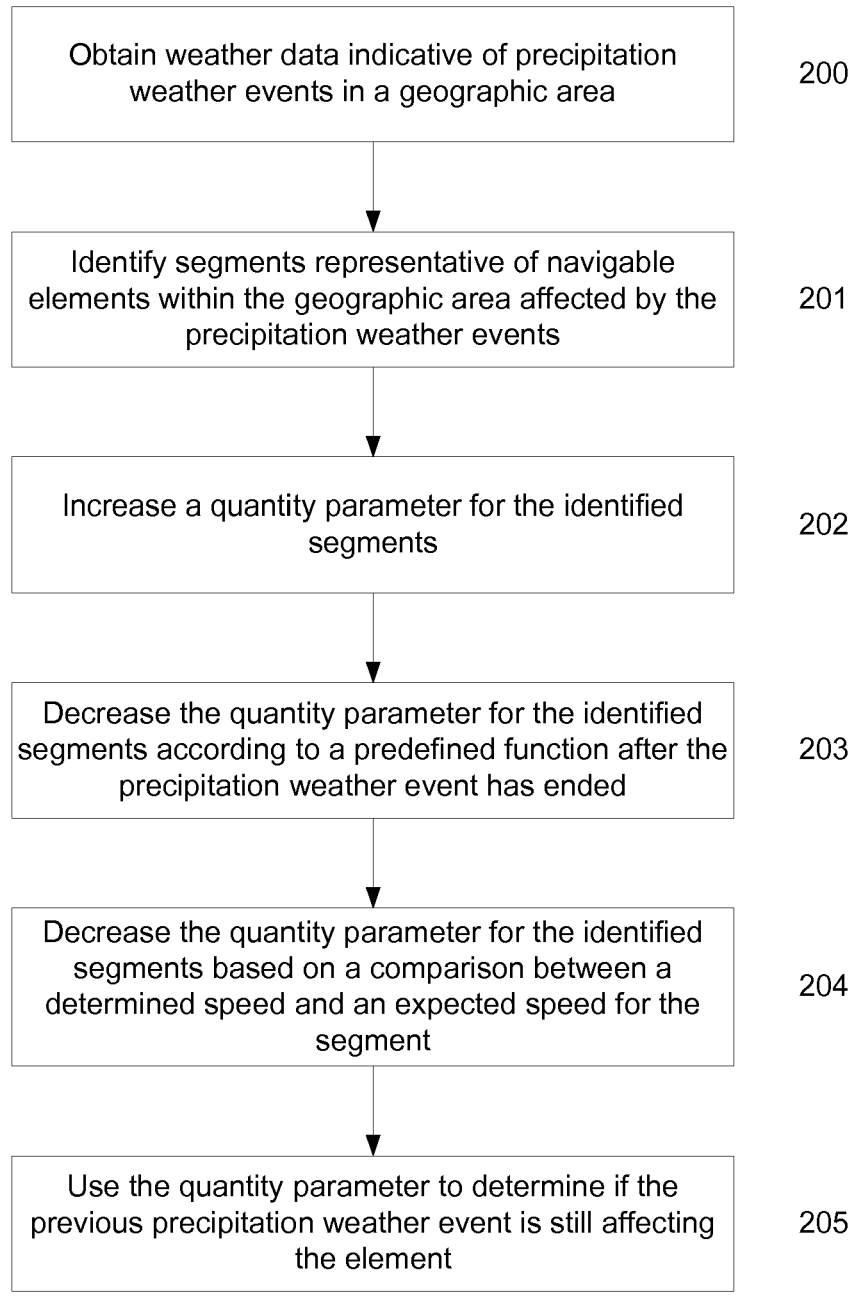
FIG. 9 is a flow chart illustrating the steps of a method for determining if a previous precipitation weather event is continuing to effect traffic flow along a navigable element.
Figure 10A:
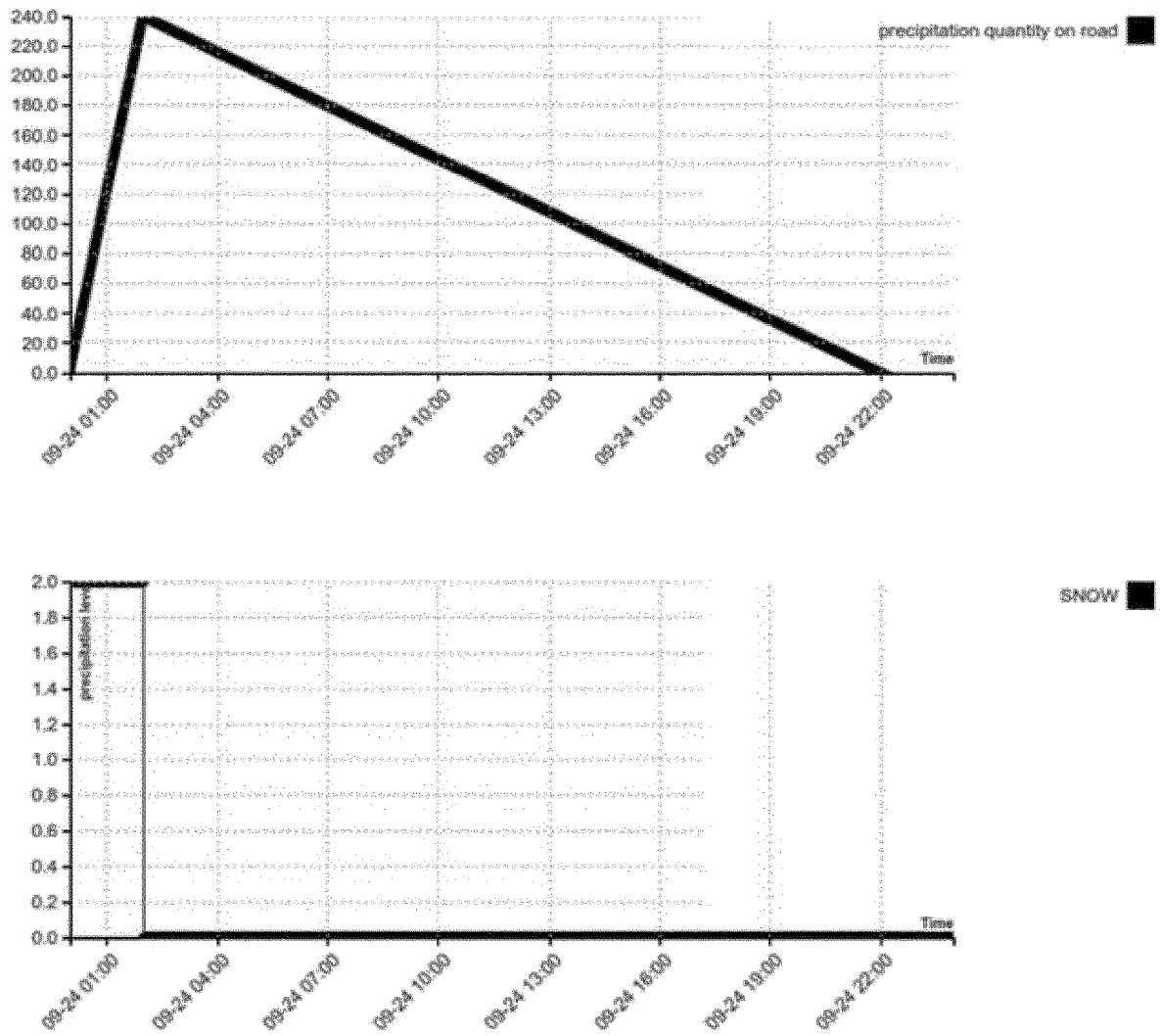
FIGS. 10A, 10B and 10C show examples of the variation in a precipitation quantity parameter.
Figure 10B:
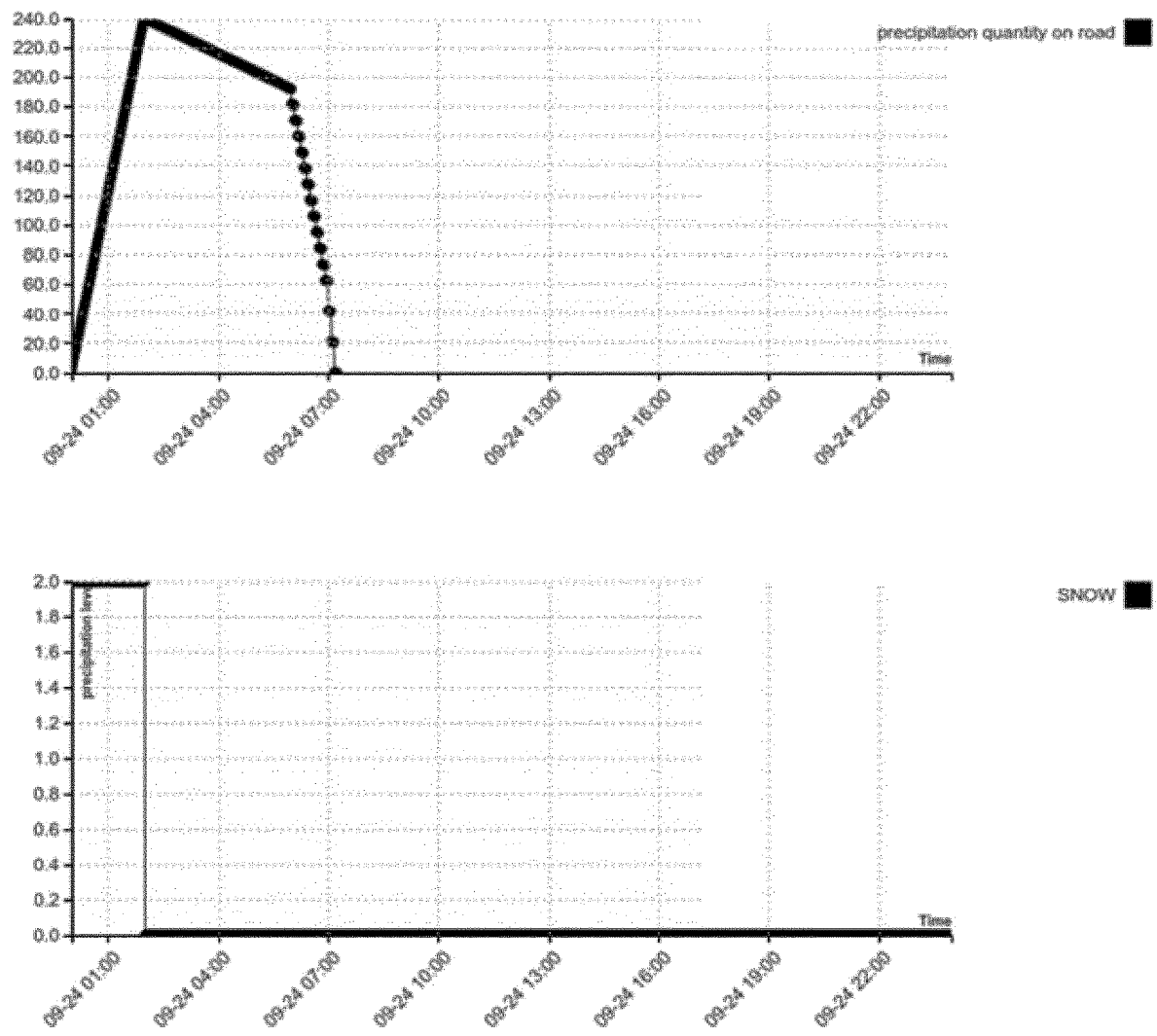

In embodiments, for each road segment, a precipitation quantity parameter is determined. An exemplary method of calculating the precipitation quantity parameter is shown in FIG. 9. The quantity parameter has a value which is indicative of the amount of precipitation remaining on the navigable element or portion thereof represented by the segment, and thus, in embodiments, will typically have a value of zero when there is no precipitation remaining on the element. The value of the quantity parameter for a given segment will increase over time when precipitation from a weather event falls on the navigable element or portion thereof represented by the segment (steps 200, 201 and 202). For example, as shown in FIGS. 10A, 10B and 100, show situations in which it has been snowing for 2 hours with the precipitation level increasing from 0 to a value of 2. Thereafter, the value of the quantity parameter for a given segment will decrease over time according to a predefined function (step 203). This aging reflects that the level of standing precipitation will reduce in the absence of any new precipitation weather events, and also reduces the value of the quantity parameter even when no or insufficient positional data is received for a segment. The predefined function can be based on a temperature of the environment at the road, such that the quantity parameter ages, i.e. decreases, at a slower rate for lower temperature. This reflects that the level of standing precipitation will likely take longer to reduce at lower temperature, e.g. at or below freezing in the case. The quantity parameter is also decreased based on monitoring the speed of devices, e.g. vehicles. along the navigable elements based on live positional data, and comparing the determined speed to an expected speed, e.g. one based on historic data (step 204). The size of the decrease based on positional data is based on the difference between the measured speed and the expected speed. Therefore, after a certain period of time, and as a result of the aging and/or due to obtained positional data, the quantity parameter reaches zero (unless a new weather event causes an increase in the parameter). At this time, then it can be said that precipitation from a recent weather event is no longer affecting traffic flow on the navigable element (step 205). Based on the precipitation quantity parameter, messages in respect of stretches of the road network can be generated indicating that there is still slowing moving traffic on the stretch due to previous precipitation, as will be discussed in more detail with respect to FIGS. 11 and 12.

Figure 10C:
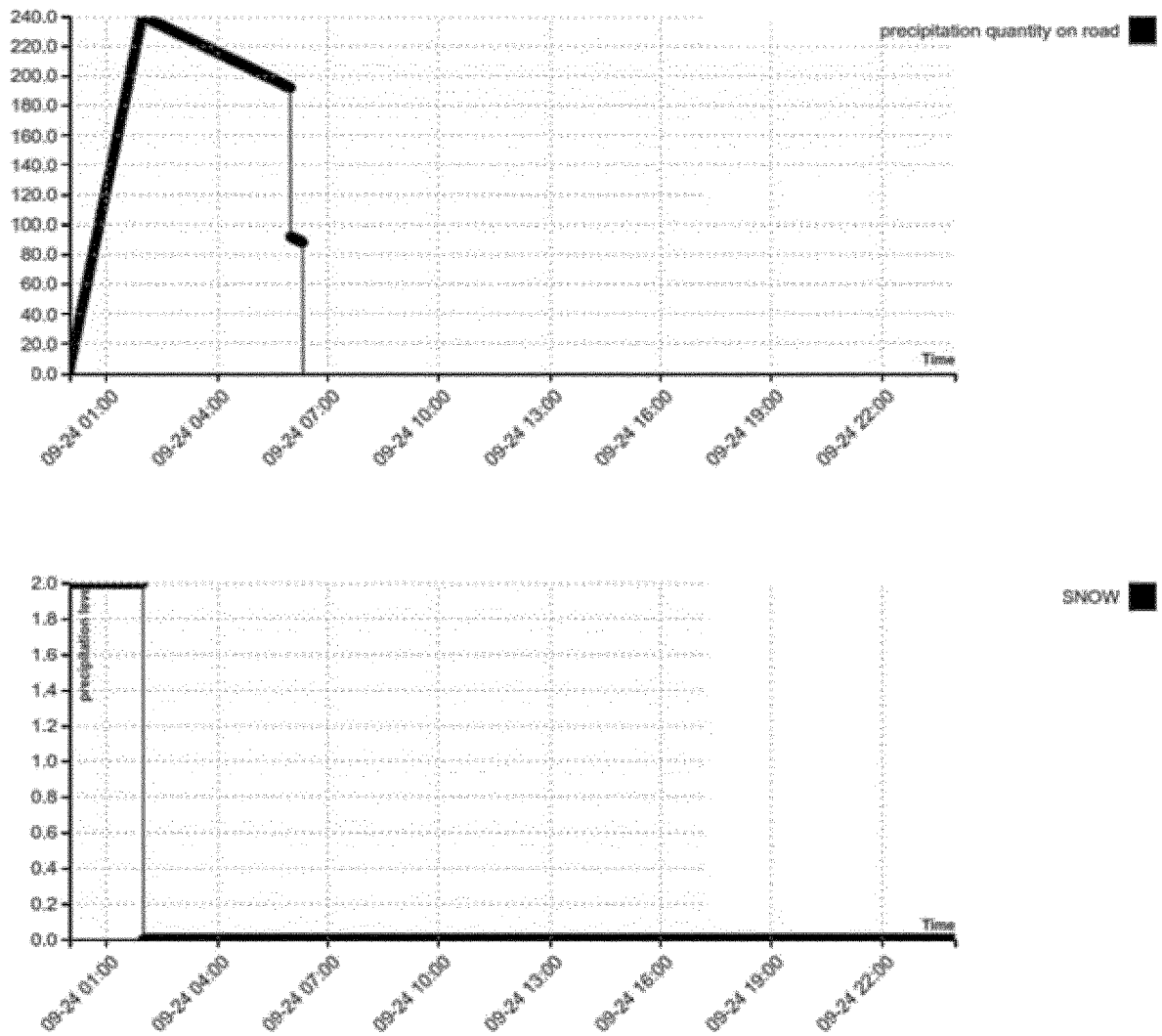

FIGS. 10A, 10B and 10C show the development of precipitation quantity for one single stretch over time. As can be seen in bottom chart of each figure it starts with snowing for 2 hours with an precipitation level of 2.0, where the quantity increases over time. Afterwards it decreases in different ways.

In FIG. 10A, the upper chart shows the precipitation level aging to zero over time in the absence of positional data, e.g. GPS traces.

In FIG. 10B, GPS traces are received every 5 minutes, with the speed of travel along the stretch increasing slowly. The upper chart shows the precipitation level, and a point can clearly be seen where the decrease due to positional data exceeds the reduction due to aging.

In FIG. 10C, GPS traces are received every 20 minutes, with vehicles initially driving until the road is cleared at which time the vehicles drive at the free flow speed. Again, the upper chart shows the precipitation level, and a point can clearly be seen where the decrease due to positional data exceeds the reduction due to aging.

Figure 11:
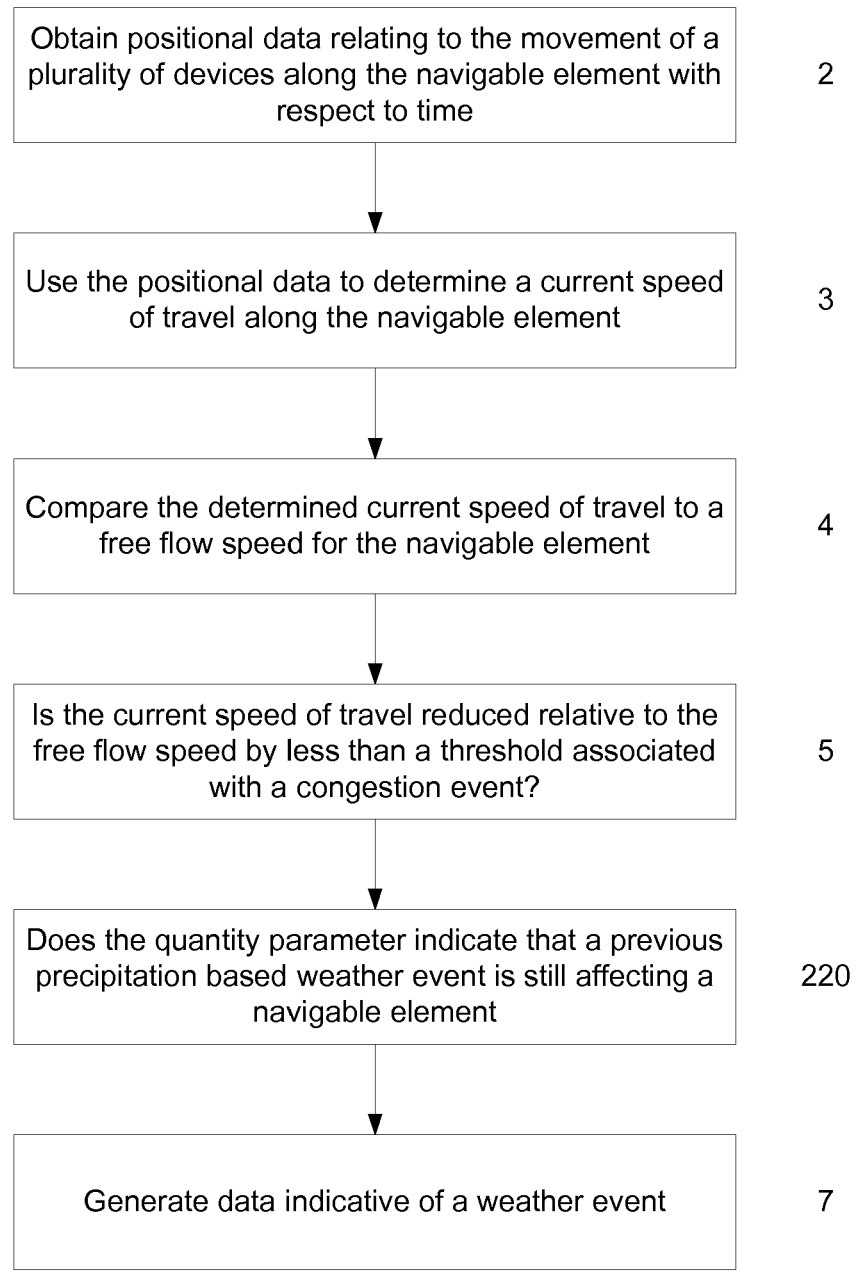
FIG. 11 is a flow chart illustrating the steps of a method for determining when traffic flow along a road element is affected by a previous precipitation based weather condition in accordance with an embodiment of the invention.

An embodiment of the invention will now be described in relation to FIG. 11. This embodiment is based on that illustrated in FIG. 1, and indeed shares a number of common steps: steps 2, 3, 4 and 5, and can be used to detect whether a previous precipitation based weather condition, e.g. rain, sleet, hail, snow, etc, is continuing to have a lasting affect flow along a road element in a road network. The steps of the method are preferably carried out by a server.

In contrast to method of FIG. 1, if a reduction in the live average speed relative to the free flow speed for the element is less than a first threshold associated with a congestion event, then, despite the element no longer being affected directly by an adverse weather condition, a check is made to see if the precipitation quantity parameter for the segment representative of the element indicates that the element remains affected by the previous weather condition—step 220. If the quantity parameter indicates that there remains standing precipitation on the road affecting traffic flow, then a weather event continues to be generated (until such a time as the quantity parameter reduces to zero)—step 7.

Figure 12:
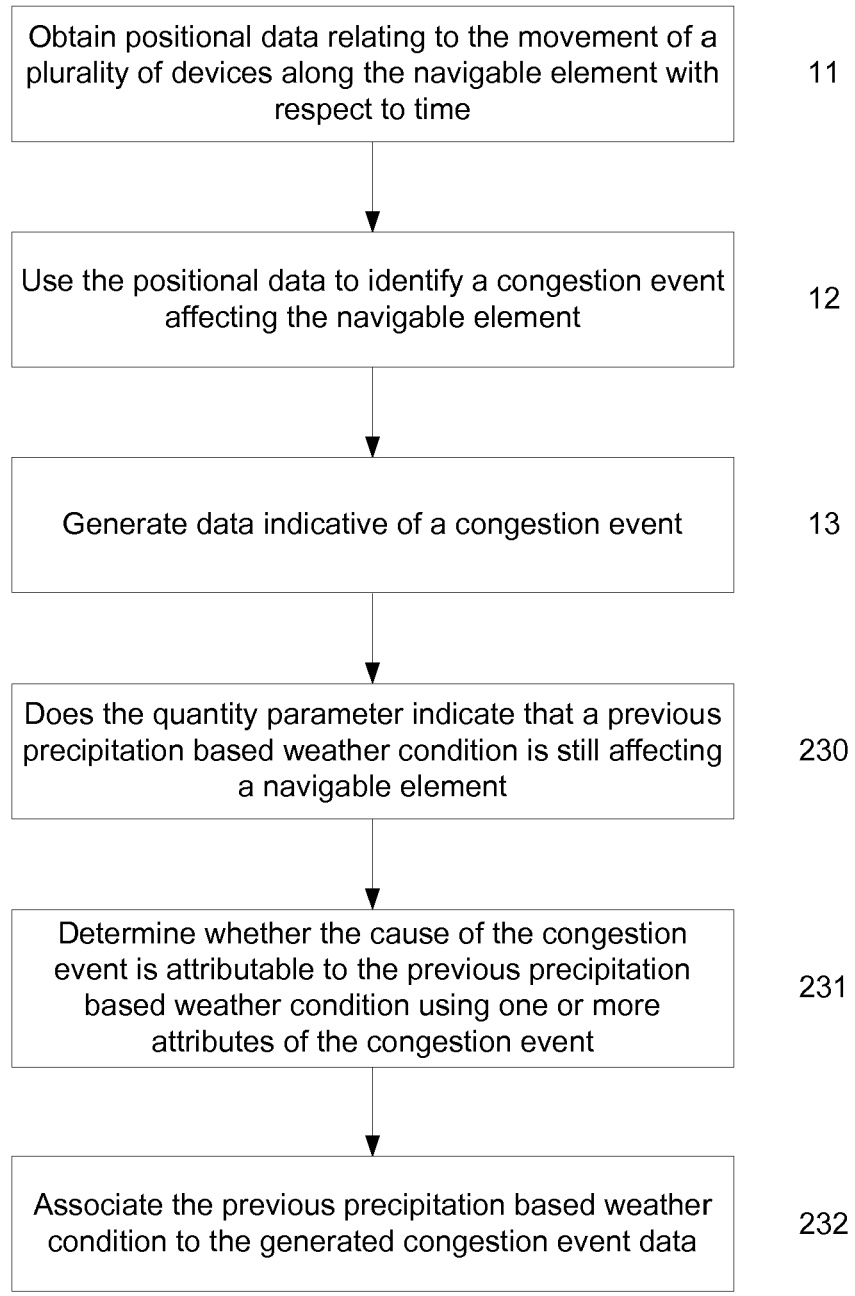
FIG. 12 is a flow chart illustrating the steps of a method for determining when a congestion event is caused by a previous precipitation based weather condition in accordance with an embodiment of the invention.

A further embodiment will now be described in relation to FIG. 12. This embodiment is based on that illustrated in FIG. 2, and again shares a number of common steps: steps 11, 12, 13, and can be used to continue to associate the cause of a congestion event to a previous weather event, or to newly associate the cause of a congestion event to a previous weather event despite that event having now passed.

In one embodiment, once a congestion event has been generated and associated with a previous weather condition, the value of the quantity parameter can be used to allow the system to continue to associate the cause of the congestion event to the previous weather condition. If the congestion event continues after the quantity parameter reaches zero, then the cause of the congestion can be revised such that is no longer said to be caused by a weather condition.

In another embodiment, if a congestion event is generated after an adverse weather condition has passed, the quantity parameter can be used to associate the cause the congestion event to the previous precipitation based weather condition—see steps 230, 231 and 232. The techniques for determining whether the cause of a congestion event can be attributed to the previous weather condition will typically be the same as those used described above in relation to method of FIG. 2.

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

What is claimed is:

1. A method for identifying navigable elements along which traffic flow remains affected by a previous precipitation based weather condition in a navigable network within a geographic area, the method comprising:
   obtaining data indicative of whether a navigable element is still affected by the previous precipitation based weather condition based on a quantity parameter representative of an amount of precipitation remaining on the navigable element;
   obtaining positional data relating to a movement of a plurality of devices along the navigable element with respect to time;
   using the positional data to determine a current speed of travel along the navigable element;
   comparing the current speed of travel to a free flow speed for the navigable element;
   determining that the navigable element remains affected by the previous precipitation based weather condition when:
      the data indicates the navigable element is still affected by the previous precipitation based weather condition, and
      the comparison indicates the current speed of travel along the navigable element is reduced relative to the free flow speed for the navigable element by less than a threshold associated with identifying a congestion event as affecting the navigable element;
   generating data indicative of a weather event affecting traffic flow along the navigable element; and
   controlling, by a vehicle control system in a vehicle, one or more operating behaviors of the vehicle based on the data indicative of the weather event.

2. The method of claim 1, comprising generating data indicative of a congestion event affecting traffic flow along the navigable element when the comparison indicates the current speed of travel along the navigable element is reduced relative to the free flow speed for the navigable element by more than the threshold associated with identifying a congestion event as affecting the navigable element.

3. The method of claim 2, comprising:
   determining that the cause of the congestion event is attributable to the previous precipitation based weather conditions using one or more attributes of the congestion event when the data indicates the navigable element is still affected by the previous precipitation based weather condition; and
   associating data indicative of the previous precipitation based weather condition with the congestion event when the cause of the congestion event is determined to be attributable to the previous precipitation based weather condition.

4. The method of claim 1, wherein navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein a value of the quantity parameter varies according to a predefined function with respect to time such that the quantity parameter decreases in an absence of any precipitation weather event, and wherein the method further comprises determining the quantity parameter representative of the amount of precipitation remaining on the navigable element by:
   obtaining weather data indicative of one or more precipitation weather events in a geographic area, wherein each precipitation weather event affects at least a portion of the geographic area;
   obtaining positional data relating to a movement of a respective plurality of devices along one or more of the navigable elements with respect to time and using the positional data to determine a determined speed of travel of devices along the one or more navigable elements;
   identifying one or more identified segments representative of navigable elements within the portions of the geographic area affected by the one or more precipitation weather events and increasing, for each of the one or more identified segments, the value of the quantity parameter associated with that identified segment; and
   comparing, for each of the one or more identified segments, the determined speed of travel to an expected speed of travel for that identified segment and decreasing the value of the quantity parameter associated with that identified segment based on a difference between the determined speed of travel and the expected speed of travel.

5. A method for identifying navigable elements along which traffic flow remains affected by a previous precipitation based weather condition in a navigable network within a geographic area, the method comprising:
   obtaining data indicative of whether a navigable element is still affected by the previous precipitation based weather condition based on a quantity parameter representative of an amount of precipitation remaining on the navigable element;
   obtaining positional data relating to a movement of a plurality of devices along the navigable element with respect to time and using the positional data to identify a congestion event as affecting traffic flow along the navigable element;
   determining that a cause of the congestion event is attributable to the previous precipitation based weather condition using one or more attributes of the congestion event when the data indicates the navigable element is still affected by the previous precipitation based weather condition, wherein the one or more attributes of the congestion event include whether a variance of speeds of devices on the navigable element exceeds a specified threshold;

associating data indicative of the previous precipitation based weather condition with the congestion event when the cause of the congestion event is determined to be attributable to the previous precipitation based weather condition; and controlling, by a vehicle control system in a vehicle, one or more operating behaviors of the vehicle based on the data indicative of the previous precipitation based weather condition.

6. The method of claim 5, wherein the navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein a value of the quantity parameter varies according to a predefined function with respect to time such that the quantity parameter decreases in an absence of any precipitation weather event, and wherein the method further comprises determining the quantity parameter representative of the amount of precipitation remaining on the navigable element by:

obtaining weather data indicative of one or more precipitation weather events in the geographic area, wherein each precipitation weather event affects at least a portion of the geographic area;

obtaining positional data relating to a movement of a respective plurality of devices along one or more of the navigable elements with respect to time and using the positional data to determine a determined speed of travel of devices along the one or more navigable elements;

identifying one or more identified segments representative of navigable elements within the portions of the geographic area affected by the one or more precipitation weather events and increasing, for each of the one or more identified segments, the value of the quantity parameter associated with that identified segment; and comparing, for each of the one or more identified segments, the determined speed of travel to an expected speed of travel for that identified segment and decreasing the value of the quantity parameter associated with that identified segment based on a difference between the determined speed of travel and the expected speed of travel.

7. A system for identifying navigable elements along which traffic flow remains affected by a previous precipitation based weather condition in a navigable network within a geographic area, the system comprising:

a processor; and a memory, the processor and memory configured to:

obtain data indicative of whether a navigable element is still affected by the previous precipitation based weather condition based on a quantity parameter representative of an amount of precipitation remaining on the navigable element;

obtain positional data relating to a movement of a plurality of devices along the navigable element with respect to time;

use the positional data to determine a current speed of travel along the navigable element;

compare the determined current speed of travel to a free flow speed for the navigable element;

determine that the navigable element remains affected by the previous precipitation based weather condition when:

the data indicates the navigable element is still affected by the previous precipitation based weather condition; and the comparison indicates the current speed of travel along the navigable element is reduced relative to the free flow speed for the navigable element by less than a threshold associated with identifying a congestion event as affecting the navigable element;

generate data indicative of a weather event affecting traffic flow along the navigable element; and controlling, by a vehicle control system in a vehicle, one or more operating behaviors of the vehicle based on the data indicative of the weather event.

8. The system of claim 7, wherein the system is a server.

9. The system of claim 7, wherein the processor and memory are further configured to:

generate data indicative of a congestion event affecting traffic flow along the navigable element when the comparison indicates the current speed of travel along the navigable element is reduced relative to the free flow speed for the navigable element by more than the threshold associated with identifying a congestion event as affecting the navigable element.

10. The system of claim 9, wherein the processor and memory are further configured to:

determine that the cause of the congestion event is attributable to the previous precipitation based weather conditions using one or more attributes of the congestion event when the data indicates the navigable element is still affected by the previous precipitation based weather condition; and associate data indicative of the previous precipitation based weather condition with the congestion event when the cause of the congestion event is determined to be attributable to the previous precipitation based weather condition.

11. The system of claim 7, wherein navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein the value of the quantity parameter varies according to a predefined function with respect to time such that the quantity parameter decreases in an absence of any precipitation weather event, and wherein the processor and memory are further configured to determine the quantity parameter representative of the amount of precipitation remaining on the navigable element by:

obtaining weather data indicative of one or more precipitation weather events in a geographic area, wherein each precipitation weather event affects at least a portion of the geographic area;

obtaining positional data relating to a movement of a respective plurality of devices along one or more of the navigable elements with respect to time and using the positional data to determine a determined speed of travel of devices along the one or more navigable elements;

identifying one or more identified segments representative of navigable elements within the portions of the geographic area affected by the one or more precipitation weather events and increasing, for each of the one or more identified segments, the value of the quantity parameter associated with that identified segment; and comparing, for each of the one or more identified segments, the determined speed of travel to an expected speed of travel for that identified segment and decreasing the value of the quantity parameter associated with that identified segment based on a difference between the determined speed of travel and the expected speed of travel.

12. A system for identifying navigable elements along which traffic flow remains affected by a previous precipitation based weather condition in a navigable network within a geographic area, the system comprising:

a processor; and a memory, the processor and memory configured to:
obtain data indicative of whether a navigable element is still affected by the previous precipitation based weather condition based on a quantity parameter representative of an amount of precipitation remaining on the navigable element;
obtain positional data relating to a movement of a plurality of devices along the navigable element with respect to time and using the positional data to identify a congestion event as affecting traffic flow along the navigable element;
determine that a cause of the congestion event is attributable to the previous precipitation based weather condition using one or more attributes of the congestion event when the data indicates the navigable element is still affected by the previous precipitation based weather condition, wherein the one or more attributes of the congestion event include whether a variance of speeds of devices on the navigable element exceeds a specified threshold;
associate data indicative of the previous precipitation based weather condition with the congestion event when the cause of the congestion event is determined to be attributable to the previous precipitation based weather condition; and
controlling, by a vehicle control system in a vehicle, one or more operating behaviors of the vehicle based on the data indicative of the previous precipitation based weather condition.

13. The method of claim 12, wherein the system is a server.

14. The system of claim 12, wherein the navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein the value of the quantity parameter varies according to a predefined function with respect to time such that the quantity parameter decreases in an absence of any precipitation weather event, and wherein the processor and the memory are further configured to determine the quantity parameter representative of the amount of precipitation remaining on the navigable element by:

obtaining weather data indicative of one or more precipitation weather events in the geographic area, wherein each precipitation weather event affects at least a portion of the geographic area;

obtaining positional data relating to a movement of a respective plurality of devices along one or more of the navigable elements with respect to time and using the positional data to determine a determined speed of travel of devices along the one or more navigable elements;

identifying one or more segments representative of navigable elements within the portions of the geographic area affected by the one or more precipitation weather events and increasing, for each of the one or more identified segments, the value of the quantity parameter associated with that identified segment; and comparing, for each of the one or more identified segments, the determined speed of travel to an expected speed of travel for that identified segment and decreasing the value of the quantity parameter associated with that identified segment based on a difference between the determined speed of travel and the expected speed of travel.

15. A non-transitory computer-readable storage medium storing instructions that, when executed by a system, cause the system to perform a method for identifying navigable elements along which traffic flow remains affected by a previous precipitation based weather condition in a navigable network within a geographic area, the method comprising:

obtaining data indicative of whether a navigable element is still affected by the previous precipitation based weather condition based on a quantity parameter representative of an amount of precipitation remaining on the navigable element;

obtaining positional data relating to a movement of a plurality of devices along the navigable element with respect to time;

using the positional data to determine a current speed of travel along the navigable element;

comparing the current speed of travel to a free flow speed for the navigable element;

determining that the navigable element remains affected by the previous precipitation based weather condition when:
the data indicates the navigable element is still affected by the previous precipitation based weather condition, and
the comparison indicates the current speed of travel along the navigable element is reduced relative to the free flow speed for the navigable element by less than a threshold associated with identifying a congestion event as affecting the navigable element;

generating data indicative of a weather event affecting traffic flow along the navigable element; and controlling, by a vehicle control system in a vehicle, one or more operating behaviors of the vehicle based on the data indicative of the weather event.

16. The non-transitory computer readable medium of claim 15, wherein the method further comprises:

generating data indicative of a congestion event affecting traffic flow along the navigable element when the comparison indicates the current speed of travel along the navigable element is reduced relative to the free flow speed for the navigable element by more than the threshold associated with identifying a congestion event as affecting the navigable element.

17. The non-transitory computer readable medium of claim 16, wherein the method further comprises:

determining that the cause of the congestion event is attributable to the previous precipitation based weather conditions using one or more attributes of the congestion event when the data indicates the navigable element is still affected by the previous precipitation based weather condition; and associating data indicative of the previous precipitation based weather condition with the congestion event when the cause of the congestion event is determined to be attributable to the previous precipitation based weather condition.

18. The non-transitory computer readable medium of claim 15, wherein navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein the value of the quantity parameter varies according to a predefined function with respect to time such that the quantity parameter decreases in an absence of any precipitation weather event, and wherein the method further comprises determining the quantity parameter representative of the amount of precipitation remaining on the navigable element by:

obtaining weather data indicative of one or more precipitation weather events in a geographic area, wherein each precipitation weather event affects at least a portion of the geographic area;

obtaining positional data relating to a movement of a respective plurality of devices along one or more of the navigable elements with respect to time and using the positional data to determine a determined speed of travel of devices along the one or more navigable elements;

identifying one or more identified segments representative of navigable elements within the portions of the geographic area affected by the one or more precipitation weather events and increasing, for each of the one or more identified segments, the value of the quantity parameter associated with that identified segment; and comparing, for each of the one or more identified segments, the determined speed of travel to an expected speed of travel for that identified segment and decreasing the value of the quantity parameter associated with that identified segment based on a difference between the determined speed of travel and the expected speed of travel.

19. A non-transitory computer-readable storage medium storing instructions that, when executed by a system, cause the system to perform a method for identifying navigable elements along which traffic flow remains affected by a previous precipitation based weather condition in a navigable network within a geographic area, the method comprising:

obtaining data indicative of whether a navigable element is still affected by the previous precipitation based weather condition based on a quantity parameter representative of an amount of precipitation remaining on the navigable element;

obtaining positional data relating to a movement of a plurality of devices along the navigable element with respect to time and using the positional data to identify a congestion event as affecting traffic flow along the navigable element;

determining that a cause of the congestion event is attributable to the previous precipitation based weather condition using one or more attributes of the congestion event when the data indicates the navigable element is still affected by the previous precipitation based weather condition, wherein the one or more attributes of the congestion event include whether a variance of speeds of devices on the navigable element exceeds a specified threshold;

associating data indicative of the previous precipitation based weather condition with the congestion event when the cause of the congestion event is determined to be attributable to the previous precipitation based weather condition; and controlling, by a vehicle control system in a vehicle, one or more operating behaviors of the vehicle based on the data indicative of the previous precipitation based weather condition.

20. The non-transitory computer readable medium of claim 19, wherein the navigable elements are represented by one or more segments of an electronic map, wherein at least some of the one or more segments of the electronic map are each associated with data indicative of a quantity parameter for that segment, the quantity parameter being indicative of an amount of precipitation remaining on the navigable element or portion thereof represented by that segment, wherein the value of the quantity parameter varies according to a predefined function with respect to time such that the quantity parameter decreases in an absence of any precipitation weather event, and wherein the method further comprises determining the quantity parameter representative of the amount of precipitation remaining on the navigable element by:

obtaining weather data indicative of one or more precipitation weather events in the geographic area, wherein each precipitation weather event affects at least a portion of the geographic area;

obtaining positional data relating to the movement of a respective plurality of devices along one or more of the navigable elements with respect to time and using the positional data to determine a determined speed of travel of devices along the one or more navigable elements;

identifying one or more identified segments representative of navigable elements within the portions of the geographic area affected by the one or more precipitation weather events and increasing, for each of the one or more identified segments, the value of the quantity parameter associated with that identified segment; and comparing, for each of the one or more identified segments, the determined speed of travel to an expected speed of travel for that identified segment and decreasing the value of the quantity parameter associated with that identified segment based on a difference between the determined speed of travel and the expected speed of travel.

* * * * *